United States Patent
Ahn et al.

(10) Patent No.: US 9,348,509 B2
(45) Date of Patent: May 24, 2016

(54) PROPERTY MODIFICATION OF AN APPLICATION OBJECT

(75) Inventors: Shinhui Ahn, Cheongju (KR); Moonkyung Kim, Seoul (KR); Namgung Seol, Seoul (KR); Arim Kwon, Gyeonggi-Do (KR); Miyoung Kim, Gyeonggi-Do (KR); Hoyoung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 326 days.

(21) Appl. No.: 13/405,156

(22) Filed: Feb. 24, 2012

(65) Prior Publication Data

US 2013/0215044 A1 Aug. 22, 2013

Related U.S. Application Data

(60) Provisional application No. 61/600,520, filed on Feb. 17, 2012.

(30) Foreign Application Priority Data

Feb. 22, 2012 (KR) ........................ 10-2012-0018186

(51) Int. Cl.
*G06F 3/041* (2006.01)
*G06F 3/048* (2013.01)
(Continued)

(52) U.S. Cl.
CPC .......... *G06F 3/04883* (2013.01); *G06F 3/0482* (2013.01); *G06F 3/04817* (2013.01)

(58) Field of Classification Search
CPC . G06F 3/0416; G06F 3/0488; G06F 3/04817; G06F 3/04842

USPC .................................................. 345/173–178
See application file for complete search history.

(56) References Cited

U.S. PATENT DOCUMENTS

| 6,031,532 A | 2/2000 | Gourdol et al. |
| 2003/0011638 A1* | 1/2003 | Chung .......................... 345/808 |

(Continued)

FOREIGN PATENT DOCUMENTS

| EP | 2254035 | 11/2010 |
| EP | 2372516 | 10/2011 |

(Continued)

OTHER PUBLICATIONS

Ashish Bogawat, Complete Guide to Customizing Your Home Screen Icons, Sep. 27, 2011, http://android.appstorm.net/how-to/customization/complete-guide-to-customizing-your-home-screen-icons/.*

(Continued)

*Primary Examiner* — Amit Chatly
(74) *Attorney, Agent, or Firm* — Lee, Hong, Degerman, Kang & Waimey; Jonathan Kang; Harry Lee

(57) ABSTRACT

A method, system, and device for controlling a mobile device with a touch screen are disclosed. According to one embodiment, a mobile terminal comprises a display unit configured to display an object associated with an application, a sensing unit configured to sense a touch on the object, and a controller. The controller is configured to execute the application in response to a first type of touch on the object and execute an edit mode to modify property data of the object in response to a second type of touch applied to the object.

22 Claims, 25 Drawing Sheets

(51) Int. Cl.
*G06F 3/0488* (2013.01)
*G06F 3/0482* (2013.01)
*G06F 3/0481* (2013.01)

(56) References Cited

U.S. PATENT DOCUMENTS

| | | | | |
|---|---|---|---|---|
| 2004/0090470 | A1* | 5/2004 | Kim et al. | 345/846 |
| 2007/0263909 | A1* | 11/2007 | Ojima et al. | 382/118 |
| 2008/0036743 | A1 | 2/2008 | Westerman et al. | |
| 2008/0307307 | A1* | 12/2008 | Ciudad et al. | 715/719 |
| 2009/0309849 | A1 | 12/2009 | Iwema et al. | |
| 2010/0205566 | A1* | 8/2010 | Matoba | 715/838 |
| 2010/0238191 | A1* | 9/2010 | Lee et al. | 345/589 |
| 2011/0037712 | A1* | 2/2011 | Kim et al. | 345/173 |
| 2011/0252373 | A1* | 10/2011 | Chaudhri | 715/835 |
| 2012/0030628 | A1 | 2/2012 | Lee et al. | |

FOREIGN PATENT DOCUMENTS

| | | |
|---|---|---|
| KR | 100851406 | 8/2008 |
| KR | 1020110032324 | 3/2011 |

OTHER PUBLICATIONS

Windows 7, Oct. 22, 2009, Microsoft Support Lifecycle, http://support.microsoft.com/lifecycle/default.aspx?LN=en-us&x=8&y=1&c2=14019.*

PCT International Application No. PCT/KR2012/002293, Written Opinion of the International Searching Authority dated Feb. 21, 2013, 13 pages.

European Patent Office Application Serial No. 12868768.8, Search Report dated Oct. 15, 2015, 7 pages.

* cited by examiner

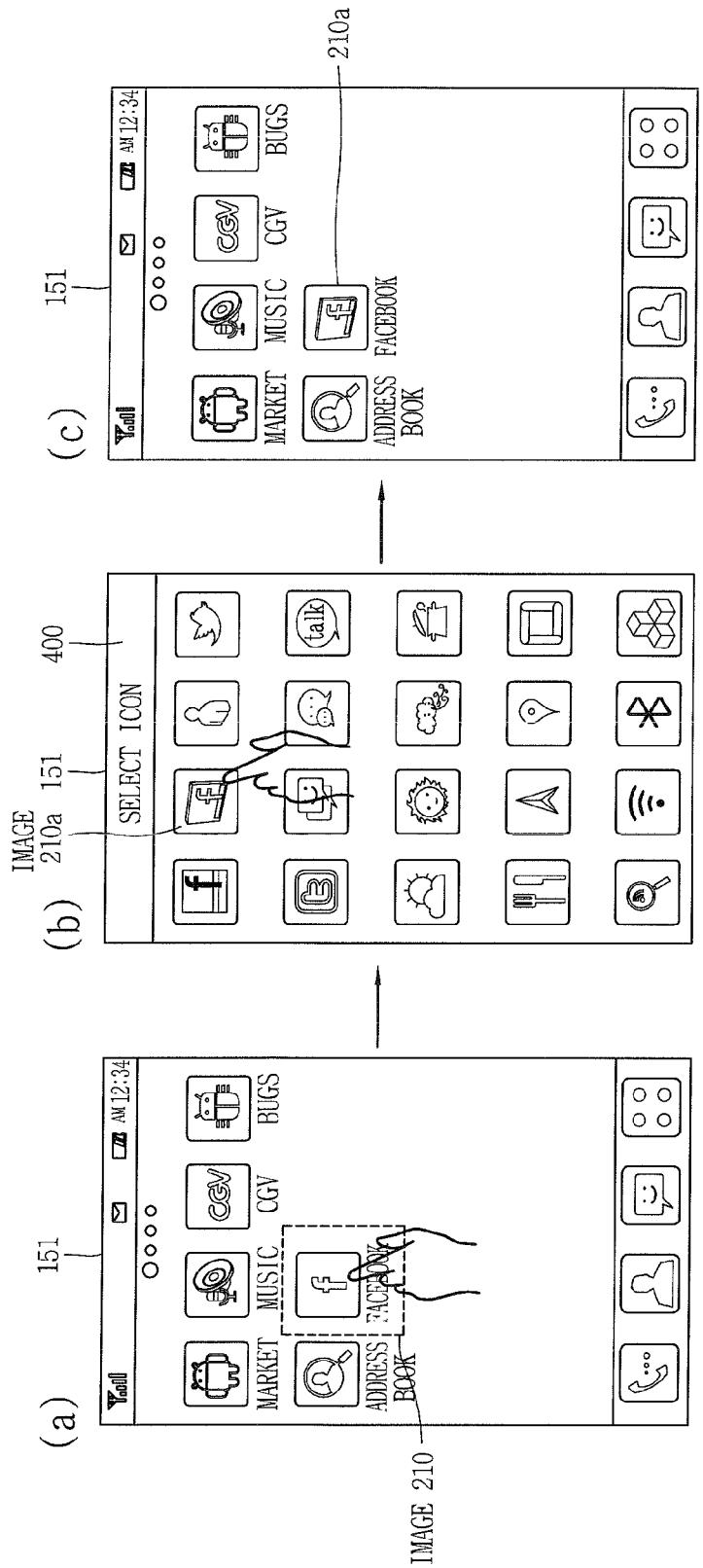

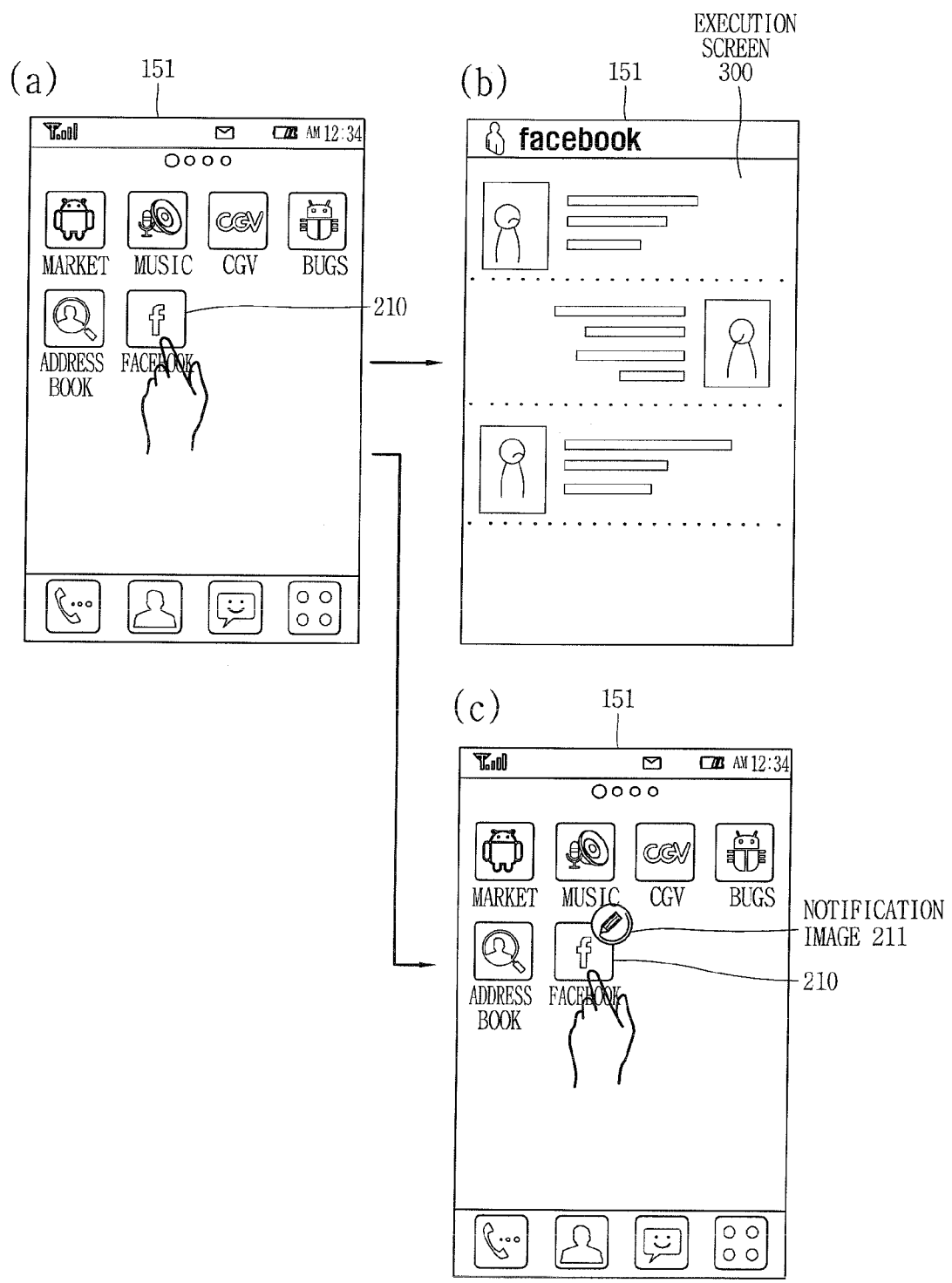

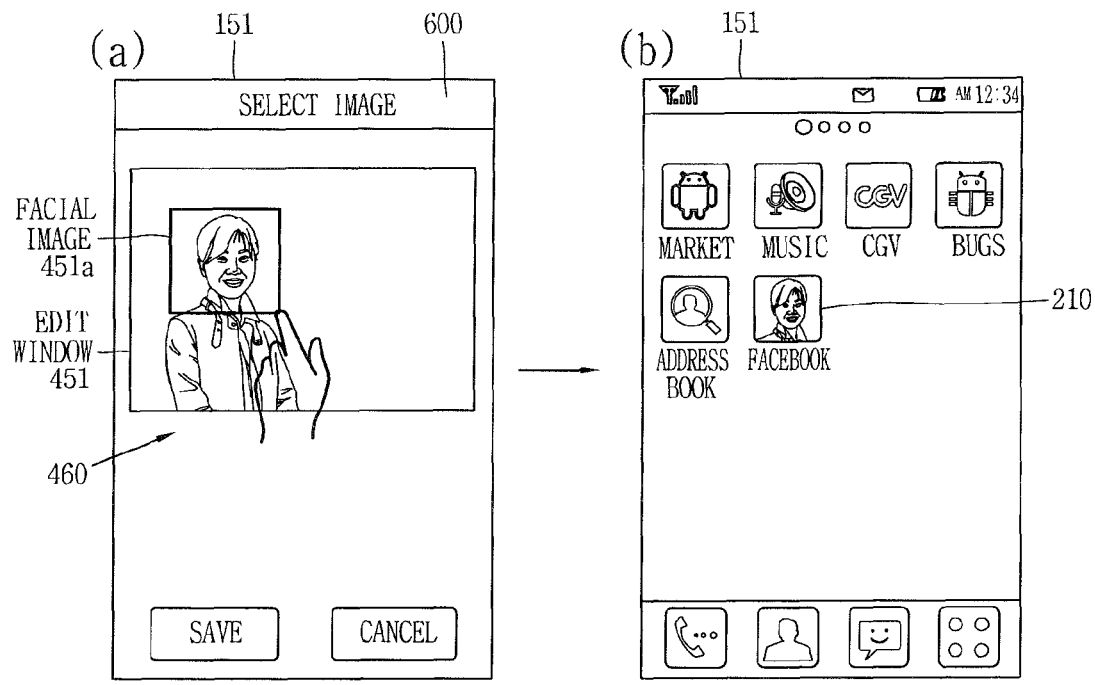
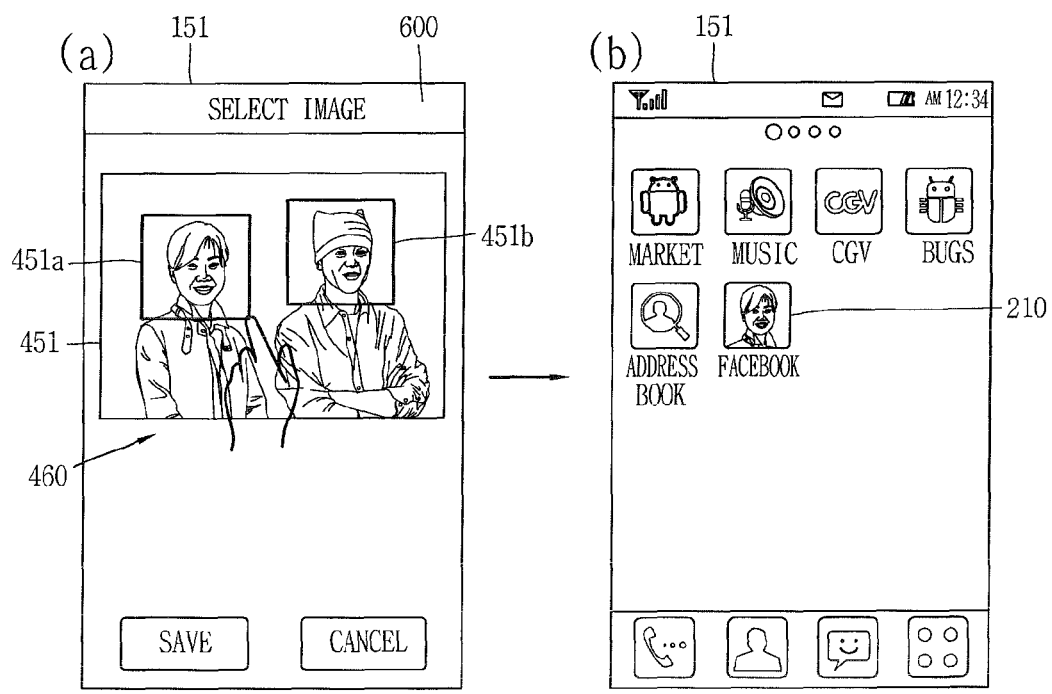

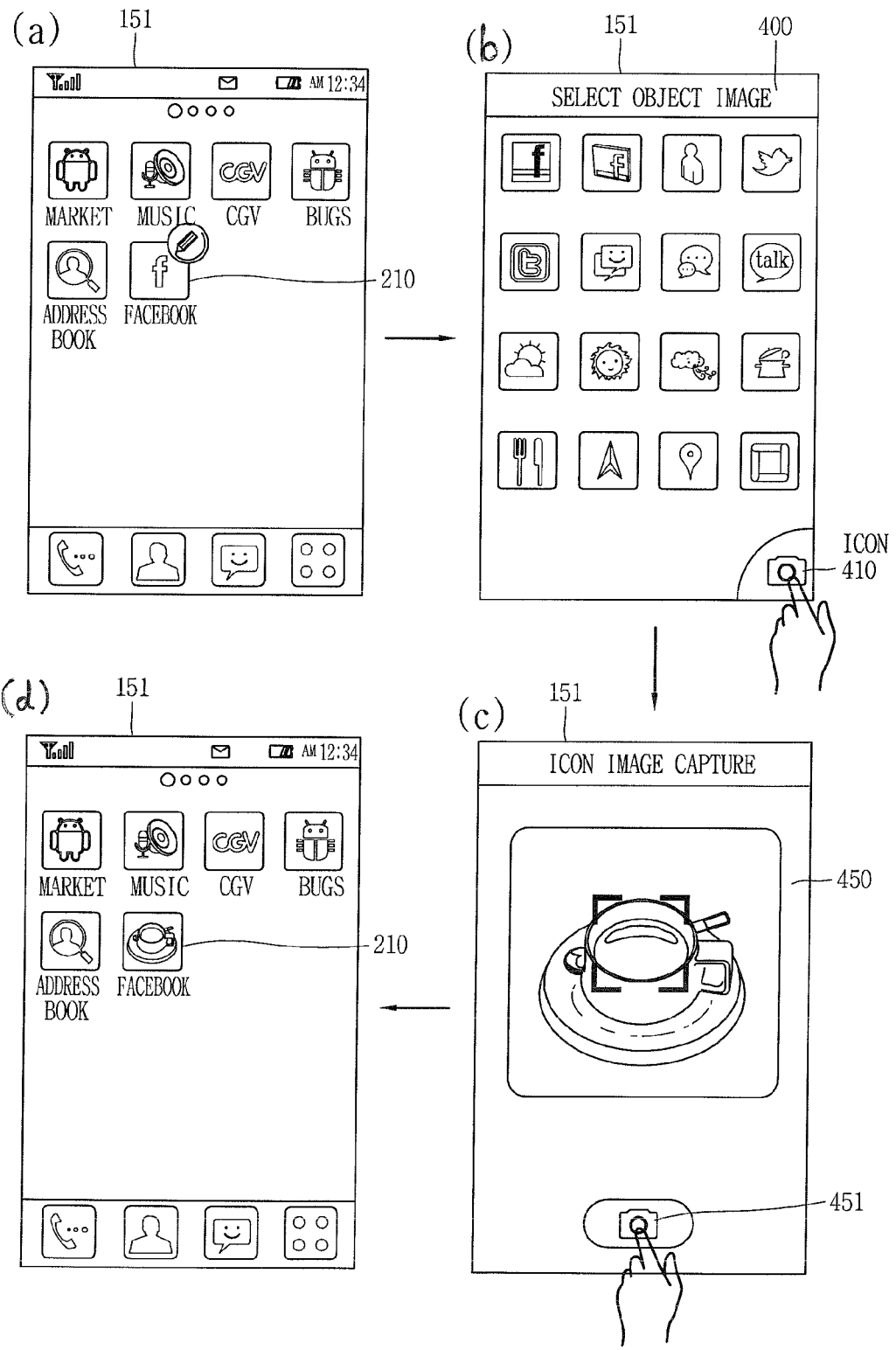

PROPERTY MODIFICATION OF AN APPLICATION OBJECT

CROSS-REFERENCE TO RELATED APPLICATIONS

Pursuant to 35 U.S.C. §119(e), this application claims the benefit of U.S. Provisional Patent Application Ser. No. 61/600,520, filed on Feb. 17, 2012, and pursuant to 35 U.S.C. §119(a), this application claims the benefit of earlier filing date and right of priority to Korean Patent Application No. 10-2012-0018186, filed on Feb. 22, 2012, the contents of which are all hereby incorporated by reference herein in their entirety.

TECHNICAL FIELD

Embodiments of the disclosure generally relate to the field of electronics, and more particularly to control methods and systems of mobile devices.

BACKGROUND

Terminal may comprise a mobile/portable terminal or a stationary terminal. The mobile/portable terminal may be further divided into a handheld terminal or vehicle mount terminal. As the features of the terminal are becoming more diverse, the terminal is becoming a multimedia player performing various functions, such as capturing images and video, playing music or media files, playing games, receiving broadcast programs, and so on. Thus, one may consider improving the software and hardware features of the terminal in order to improve upon the terminal's features. Further, the mobile/portable terminal may display icons associated with or linked to applications on the display unit, and the images of the icons may be configured by the user to different images.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

A method, system, and device for controlling a mobile device with a touch screen are disclosed. In one aspect, a mobile terminal comprises a display unit configured to display an object associated with an application, a sensing unit configured to sense a touch on the object, and a controller. The controller is configured to execute the application in response to a first type of touch on the object and execute an edit mode to modify property data of the object in response to a second type of touch applied to the object.

Other features of the embodiments will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIG. 3 illustrates an exemplary conceptual view of a mobile terminal in an edit mode, according to one embodiment.

FIGS. 5A-5D illustrate exemplary views of a mobile terminal processing a touch input to initiate an edit mode, according to one embodiment.

FIGS. 9A-9E illustrate exemplary views of configuring an image for an application object using images stored in a memory of a mobile terminal, according to one embodiment.

FIG. 10 illustrates an exemplary view of configuring an image captured by a camera of a mobile terminal as an image for an object displayed on the mobile terminal, according to one embodiment.

Figure 1:
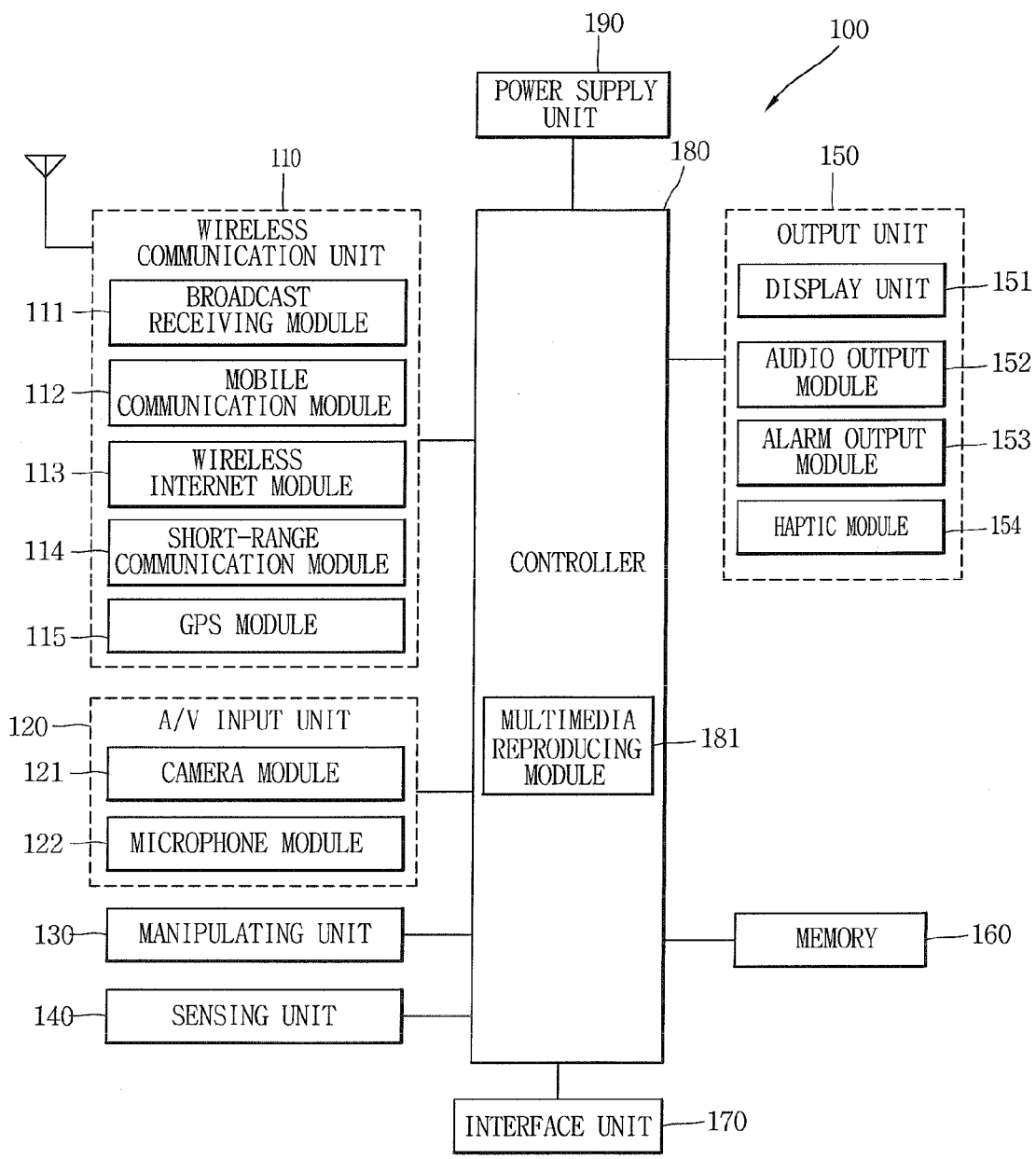
FIG. 1 illustrates an exemplary schematic block diagram of a mobile terminal according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system for controlling a mobile terminal with a touch screen are disclosed. Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the technological spirit disclosed herein by the accompanying drawings.

A mobile terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 illustrates an exemplary schematic block diagram of a mobile terminal according to one embodiment. The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence. The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160. The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception. The mobile communication module 112 may be configured to implement a video communication mode and a voice communication mode. The video communication mode refers to a configuration in which communication is made while viewing an image of the counterpart, and the voice communication mode refers to a configuration in which communication is made without viewing an image of the counterpart. The mobile communication module 112 may be configured to transmit or receive at least one of voice or image data to implement the video communication mode and voice communication mode.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like. The short-range communication module 114 is a module for supporting a short-range communication. Here, it may be used a short-range communication technology including Bluetooth, Radio Frequency IDentification (RFID), Infrared Data Association (IrDA), Ultra Wide-Band (UWB), ZigBee, and the like. The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal. The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body. Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 may be used as an input device rather than an output device. The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor. The examples of the proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer. The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner. The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like. The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen. The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 for reproducing multimedia data. The multimedia module 181 may be implemented in an integrated manner within the controller 180 or may be implemented in a separate manner from the controller 180. Furthermore, the controller 180 can perform a pattern recognition processing so as to recognize writing or drawing input on the touch screen as text or image. Furthermore, the controller 180 may implement a lock state for limiting the user's control command input to applications when the state of the mobile terminal satisfies the prescribed condition. Furthermore, the controller 180 may control a lock screen displayed in the lock state based on a touch input sensed over the display unit 151 (hereinafter, referred to as a "touch screen") in the lock state. The power supply unit 190 receives external power and internal power under the control of the controller 180 to provide power required by various components.

Various embodiments described herein may be implemented in a medium that can be read by a computer or similar device using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself. For software implementation, the embodiments such as procedures or functions may be implemented together with separate software modules. The software modules may perform at least one function or operation described herein. Software codes can be implemented by a software application written in any suitable programming language. The software codes may be stored in the memory 160 and executed by the controller 180. Hereinafter, a mobile terminal according to an embodiment of the present disclosure described in FIG. 1, or a mobile terminal disposed with constituent elements of the mobile terminal, or the structure of a mobile terminal will be described.

Figure 2A:
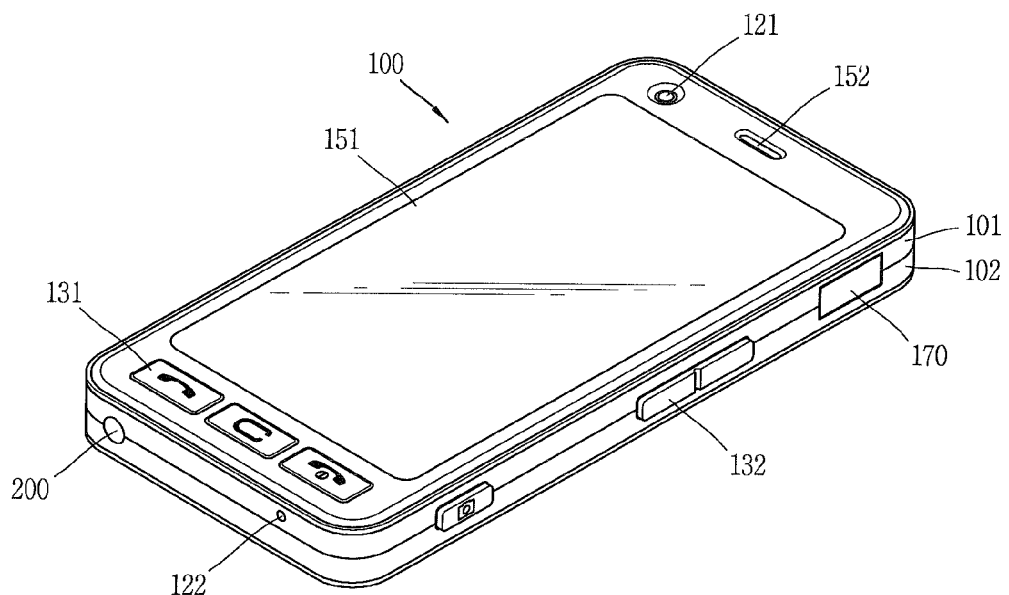
FIG. 2A is a front perspective view illustrating an example of a mobile terminal.
Figure 2B:
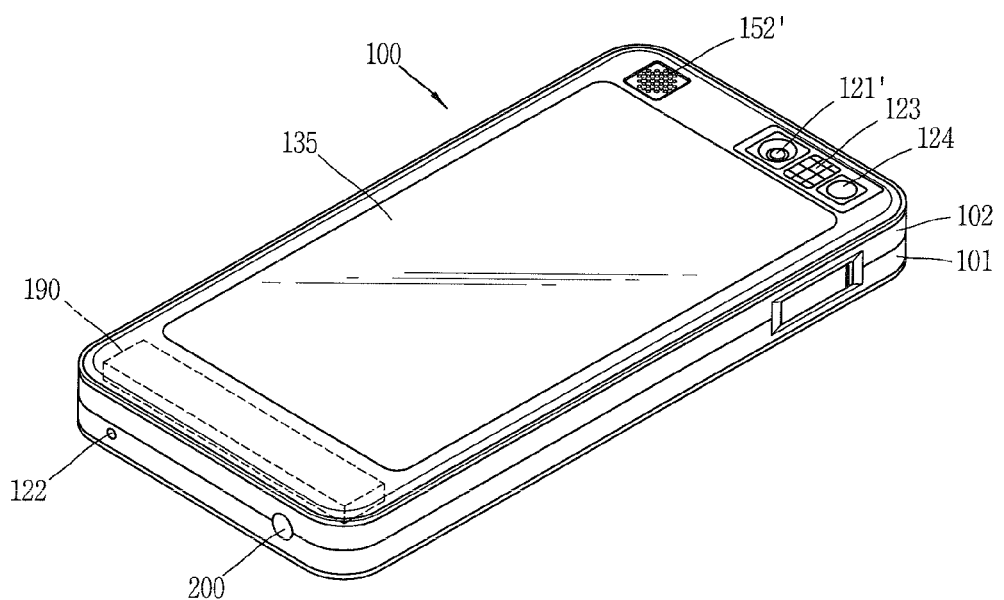
FIG. 2B is a rear perspective view illustrating the mobile terminal in FIG. 2A, according to an embodiment of the present disclosure.

FIG. 2A is a front perspective view illustrating an example of a mobile terminal, and FIG. 2B is a rear perspective view illustrating the mobile terminal in FIG. 2A, according to an embodiment of the present disclosure. The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction. The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102. The cases may be formed by injection-molding a synthetic resin or may be also formed of a metal material such as stainless steel (STS), titanium (Ti), or the like.

A display unit 151, an audio output module 152, a camera 121, a user input unit 130 (130/131, 132), a microphone 122, an interface 170, and the like may be arranged on the terminal body 100, mainly on the front case 101. The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling. The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call. Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body. Furthermore, a touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2A), and may have different pixels from those of the first video input unit 121. For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner. Furthermore, a flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102. The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

FIG. 3 illustrates an exemplary conceptual view of a mobile terminal in an edit mode, according to one embodiment. According to one embodiment, the controller 180 in FIG. 1 operates the display unit 151 to display an object (or multiple objects) associated with an application. The object may be an icon, a folder including a group of icons, or a widget. The object may be included on an idle screen, a home screen, or a menu screen. When the object is an icon, the object may comprise an image 210 associated with the application, as illustrated in FIG. 3(*a*). It is appreciated that throughout the disclosure, the object and the image of the object may be used interchangeably unless otherwise noted. In addition, the object may comprise the image 210 associated with the application as well as text describing the application. That is, in such instance, the object may include an image region as well as a text region. When the object is a folder, the object may comprise an image associated with the folder, or the object may comprise the image as well as text explaining the folder.

Accordingly, the property data or information of the object displayed on the idle screen, the home screen, and the menu screen may be changed or modified based on a selection by the user. In one embodiment, the property data may be a variety of information which includes information about the image, size, color, and/or sound associated with the object, the first page displayed when the application associated with the object is initially accessed, information relating to protection of privacy relating to the application use, the appearance of the object, and/or the method of accessing the application associated with the object.

In one example embodiment, as illustrated on FIG. 3(*a*)-3(*c*), the controller 180 causes the image of the object 210 to another image when that image is selected from multiple images displayed and available on the edit screen. For example, in FIG. 3(*b*), when an image (210*a*) is selected among the images displayed on the edit screen, the controller 180 may represent the object with the image 210*a* selected by the user on a screen selected by the user, such as the idle screen, home screen, or menu screen. It is appreciated that the state of the mobile terminal where the property data of the object can be altered is referred as the 'edit mode.' As illustrated above, the mobile terminal according to one embodiment may enable the user to modify the property data of an object associated with an application.

Figure 4:
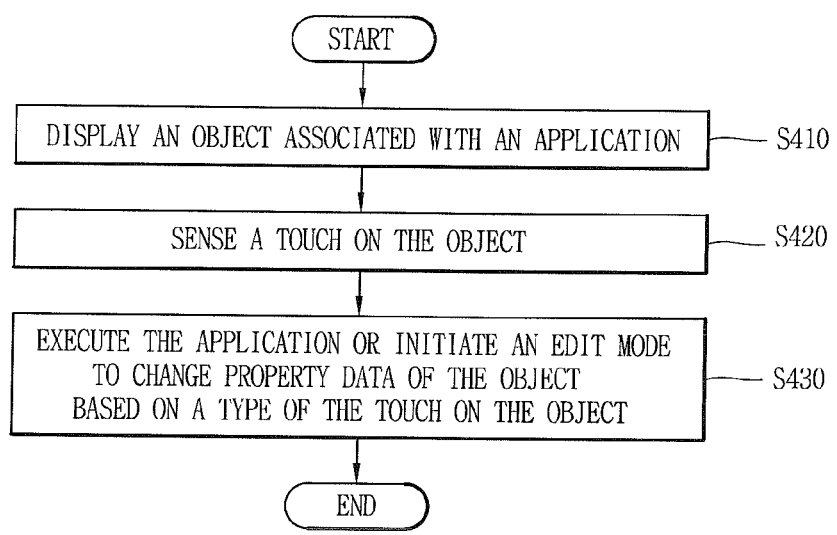
FIG. 4 illustrates a process flow chart of an exemplary method executed by a mobile terminal in an edit mode, according to one embodiment.

FIG. 4 illustrates a process flow chart of an exemplary method executed by a mobile terminal in an edit mode, according to one embodiment. FIGS. 5A-5D illustrate exemplary views of a mobile terminal processing a touch input to initiate an edit mode, according to one embodiment. In operation S410, the mobile terminal according to one embodiment displays an object associated with an application. The object may be displayed on the idle screen, the home screen, or the menu screen. In operation S420, the display unit 151 in FIG. 1 is operable or configured to receive a touch input, and the sensing unit 140 is operable or configured to sense the touch input on the object. Next, in operation S430, based on the type of the touch input applied on the object, the controller 180 either executes the application associated with the object or initiates an edit mode for modifying the property data of the object based. It is appreciated that the methods disclosed in FIG. 4 may be implemented in a form of a machine-readable medium embodying a set of instructions that, when executed by a machine, cause the machine to perform any of the operations disclosed herein.

In one embodiment, under the edit mode, an indicator (e.g., notification image 211) for notifying a possibility of modifying an object upon sensing a touch by the user as well as a possibility of executing at least one object which is not selected by the user is displayed. It is often the case where the user selects an object on the idle screen, home screen, or menu screen to execute the application associated with or linked to the object. Thus, in order to distinguish the user's intention to modify the property data of the object from the user's intention to execute the application, the controller 180 analyzes the lasting time, pattern, and/or other features of the touch input, and generates different control commands associated with the object.

For example, when the first type of touch input on an object 210 of the display unit is sensed as illustrated in FIG. 5A (*a*), the controller 180 executes the application associated with or linked to the object 210 in an execution screen 300, as illustrated in FIG. 5A (b). In addition, when the second type of touch input is sensed on the object among the objects displayed on the display unit as illustrated in FIG. 5A (a), the controller 180 executes an edit mode to modify the property data of the object 210 in response to the second type of touch input, as illustrated in FIG. 5A (c). In one embodiment, the first type of touch input comprises a single touch or tap which lasts less than a predetermined amount of time, and the second type of touch input comprises a long or long press touch which lasts more than the predetermined amount of time.

That is, the controller 180 may execute different features base on the lasting time of the touch input on the object. In such case, the controller 180 counts the time during which the touch input is maintained on the object, and different commands may be generated when the touch input is lifted or released from the object based on the measured duration of time. It is appreciated that the first and second types of touch input may be preconfigured, and there may be different ways to define or configure the first and/or second types of touch input.

Figure 5B:
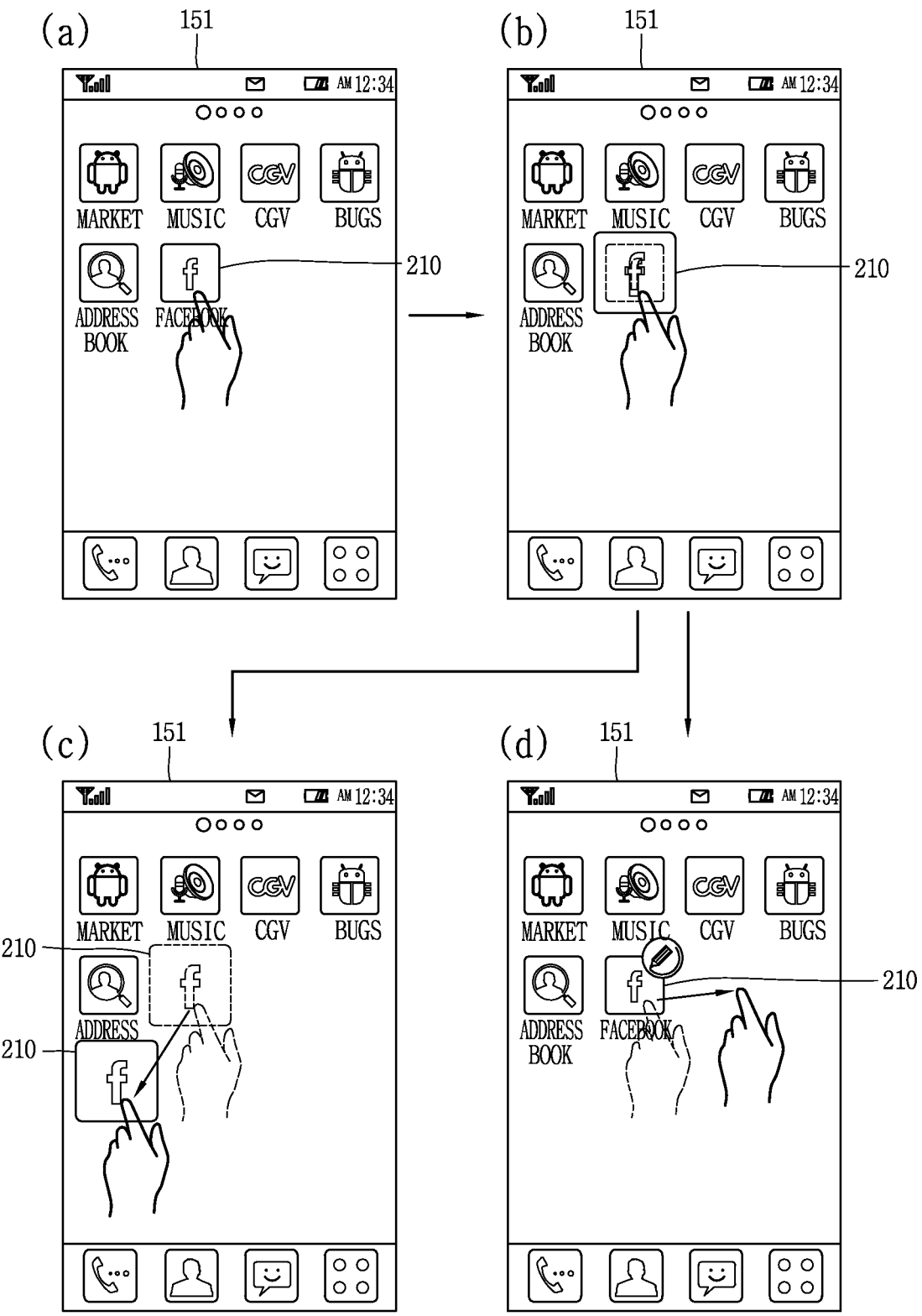

In one embodiment, an edit mode may be initiated in response to the second type of touch input on the mobile terminal. The controller 180 may execute other control modes besides the edit mode based on the second type of touch input (e.g., the long press touch input). For example, when a long press touch input on the object 210 is sensed as illustrated in FIG. 5B (a), the controller 180 may execute a migration or transit mode where the position of the object 210 may be changed, as illustrated on FIG. 5B (c). During the migration mode, the object 210 may move across the display unit (151) in response to the long press touch input or multiple consecutive touch inputs. Further, once the object 210 moves to new position upon the receipt of the touch input and/or dragging input, the object 210 may maintain the last position where the touch input is lifted or released. In such instance, the edit mode may not be carried out.

As illustrated on FIG. 5B (a), the controller 180 may initiate or execute the edit mode for the object 210 when the long press touch input on the object 210 is sensed and is subsequently lifted from the object 210. That is, as illustrated on FIG. 5B (d), the controller 180 may execute the edit mode upon the completion of the long touch press input. In one example implementation, when the long touch press input is sensed, the size of the object may be enlarged, and return to its original size once a predetermined amount time passes. In addition, a vibration effect may be generated when the object is enlarged. Further, the controller 180 may execute the edit mode based on the long touch press input, where the position of the object 210 is not tempered with. The edit mode may end automatically when there is no additional input upon the initiation of the edit mode.

That is, as illustrated on FIG. 5B (c), once the position of the object is changed in response to the long touch press input, the edit mode may not be initiated even if the long touch press input is terminated or released. On the other hand, even if the object 210 is migrated in response to the long touch press input, the controller 180 may execute the edit mode when the position of the object 210 remains the same or unchanged upon the release of the long touch press input. The controller 180 may display notification information to notify the object is in the migration mode or a possibility of getting into the edit mode upon sensing the long touch press input on the object. As illustrated on FIG. 5B (b), the notification information may be displayed according to the size of the object 210 upon detecting the long touch press input applied on the object 210. Further, the notification information may be realized through sound, vibration, guide image, etc. In one example implementation, the guide image may be in a form of a rectangular box surrounding the object 210.

Figure 5C:
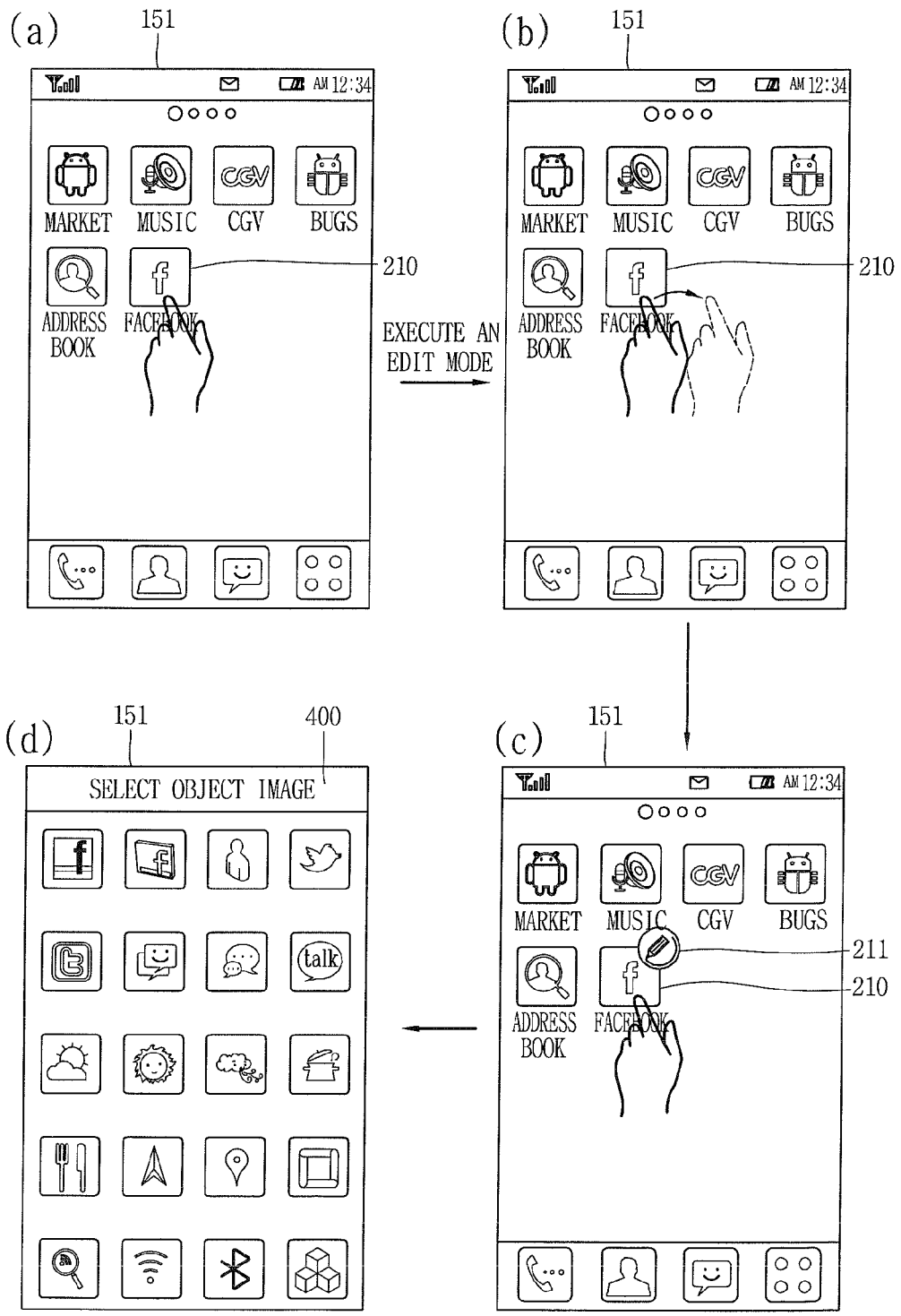

As illustrated in FIG. 5C (a) when a long press touch input is applied on the object 210 among the objects displayed on the display unit 151 and the long press touch input is completed or lifted off from the object 210 as in FIG. 5C (b), the controller 180 may execute the edit mode where the object 210 may change its property data, as illustrated in FIG. 5C (c). The controller 180 may display the notification information informing the user that the edit mode on the object 210 has been initiated. The notification information may be in at least one of sound, vibration, or image. In one example implementation, the notification information may be displayed as a notification image 211 as illustrated in FIG. 5C (c), and the notification image 211 may be overlapped on the object 210 or displayed around or in the vicinity of the object 210. Alternatively, the controller 180 may inform the user that the edit mode has been executed by presenting the object 210 in a form, as in the image of the object 210 in FIG. 5C (c), different from the object 210 of FIG. 5C (a) in stead of overlapping the notification image 211 on the object 210.

The controller 180 displays the edit screen to modify the property or property data of the object 210 when a touch input different from the long touch press input is sensed on the object 210 once the edit mode is on. That is, once the long touch press input is lifted off from the object 210 as illustrated in FIG. 5C (b), the controller 180 either changes the form of the object 210 or displays the notification image 211 informing the user to touch closer to the object 210. In addition, when a touch input different from the long touch press input on the object 210 is sensed, the controller 180 controls the display unit 151 to display an edit screen 400 ("select object image") as illustrated on FIG. 5C (d). In one example implementation, the edit screen 400 may display multiple images, and the controller 180 may present the object 210 using an image selected from the multiple images. Accordingly, the user may change the property data of the object 210 via the edit screen 400.

Figure 5D:
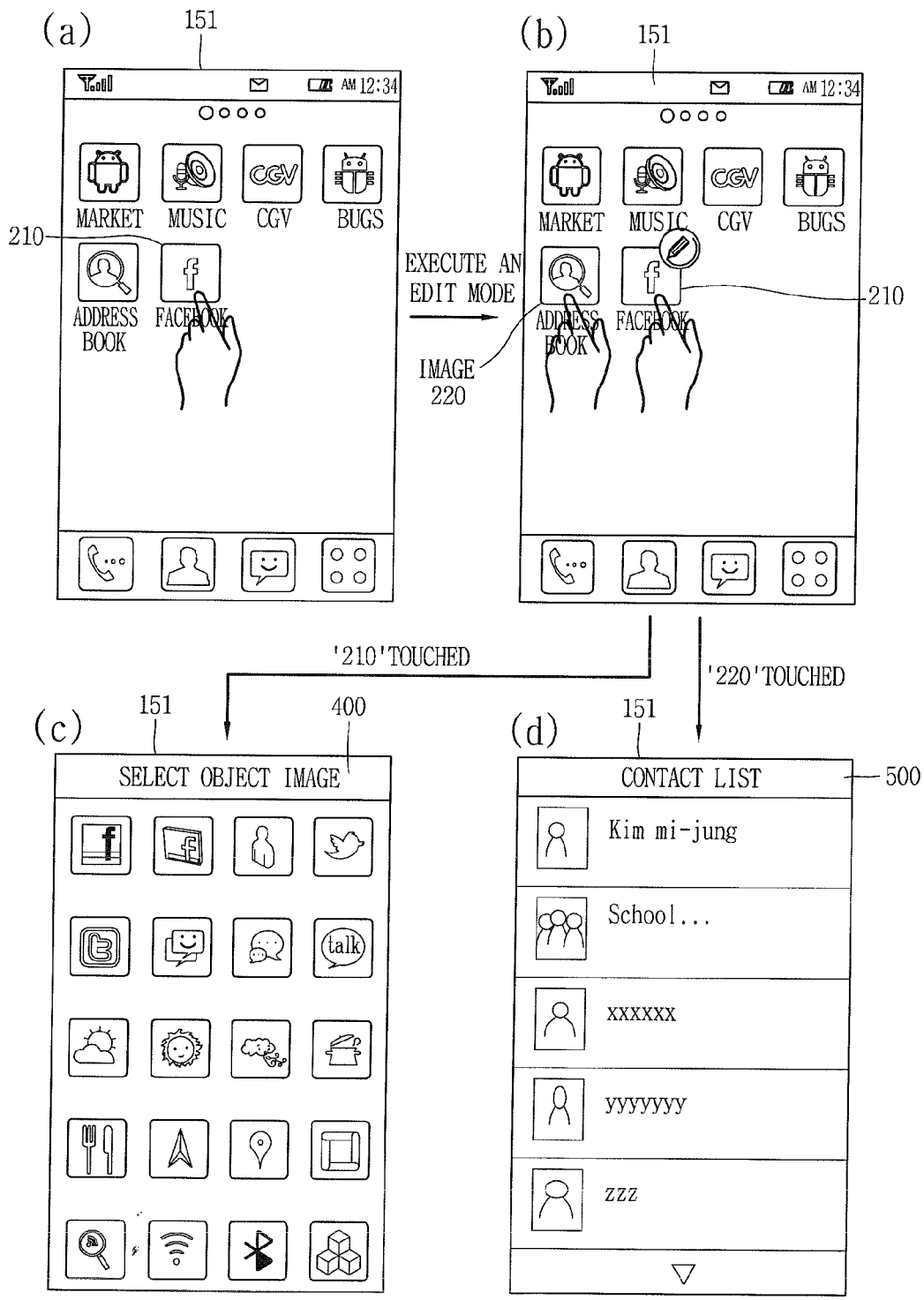

The controller 180 may end the edit mode for the object 210 and generate a control command associated with a different object (i.e., different from the object 210) when the different object is selected by user. For example, in response to the second type of touch input (e.g., the long press touch input) applied on the object 210 as illustrated in FIG. 5D (a), the controller 180 may execute the edit mode for the object 210 as in FIG. 5D (b). Regarding the object 210, the controller 180 controls the display unit 151 to display the edit screen as in FIG. 5D (c) if a touch input different from the second type of touch input is detected on the object 210. During the edit mode of the object 210, the first type of touch input on an object 220 different from the object 210 is detected as in FIG. 5D (b), an application associated with the object 220 is executed as in FIG. 5D (d). If the second type of touch input (e.g., the long press touch input) is detected on the object 220, the edit mode for the object 220 may be initiated or executed.

As discussed thus far, according to one embodiment of the mobile terminal, different control commands associated with the objects displayed on the idle screen, home screen, or menu screen may be generated using different types of touch input. Accordingly, the user may reduce the inconvenience of executing different features through selecting different menus in order to carry out a variety of features associated with an object.

Figure 6A:
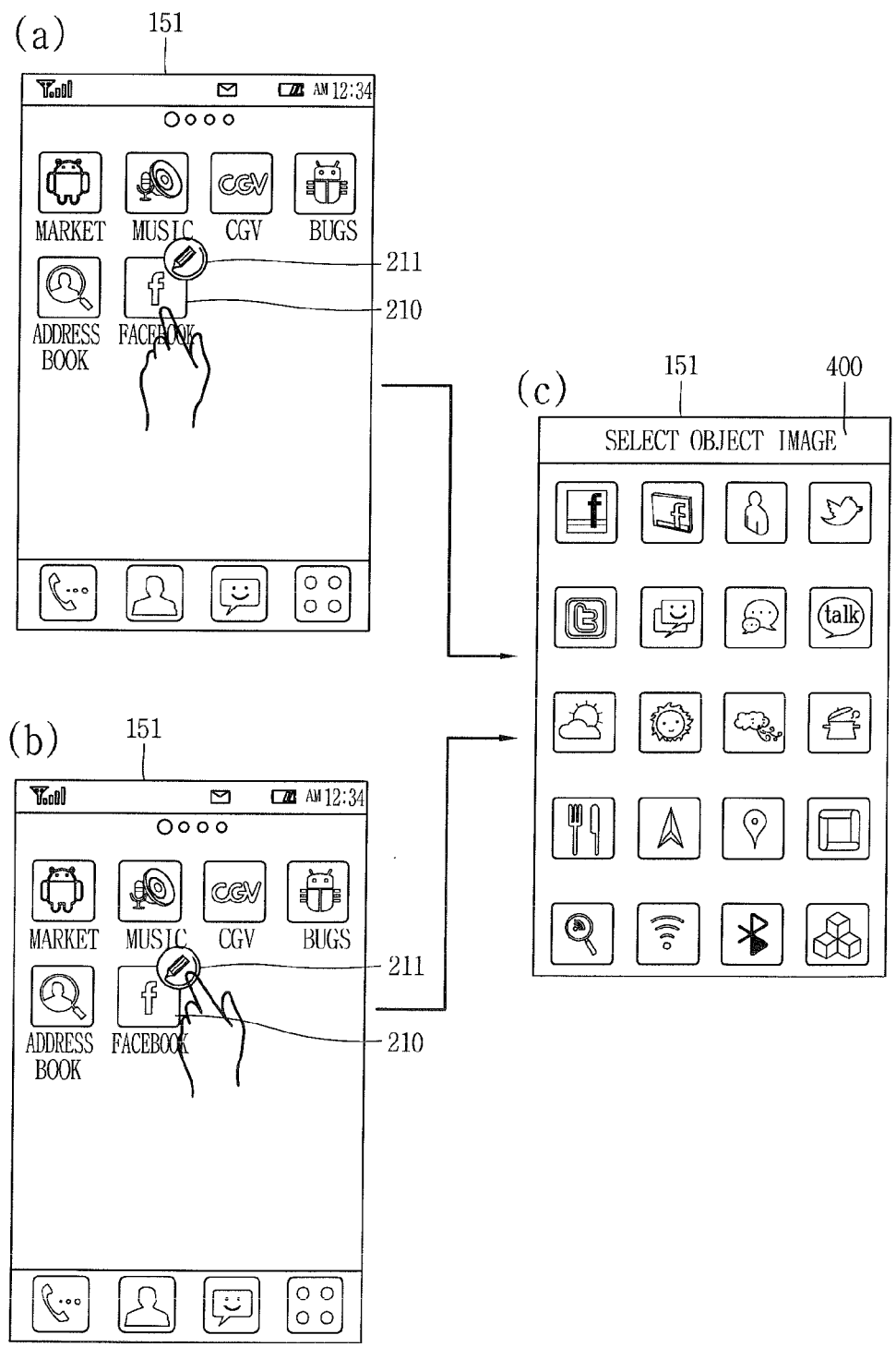
FIGS. 6A-6C illustrate exemplary views of a mobile terminal displaying an edit screen, according to one embodiment.
Figure 6B:
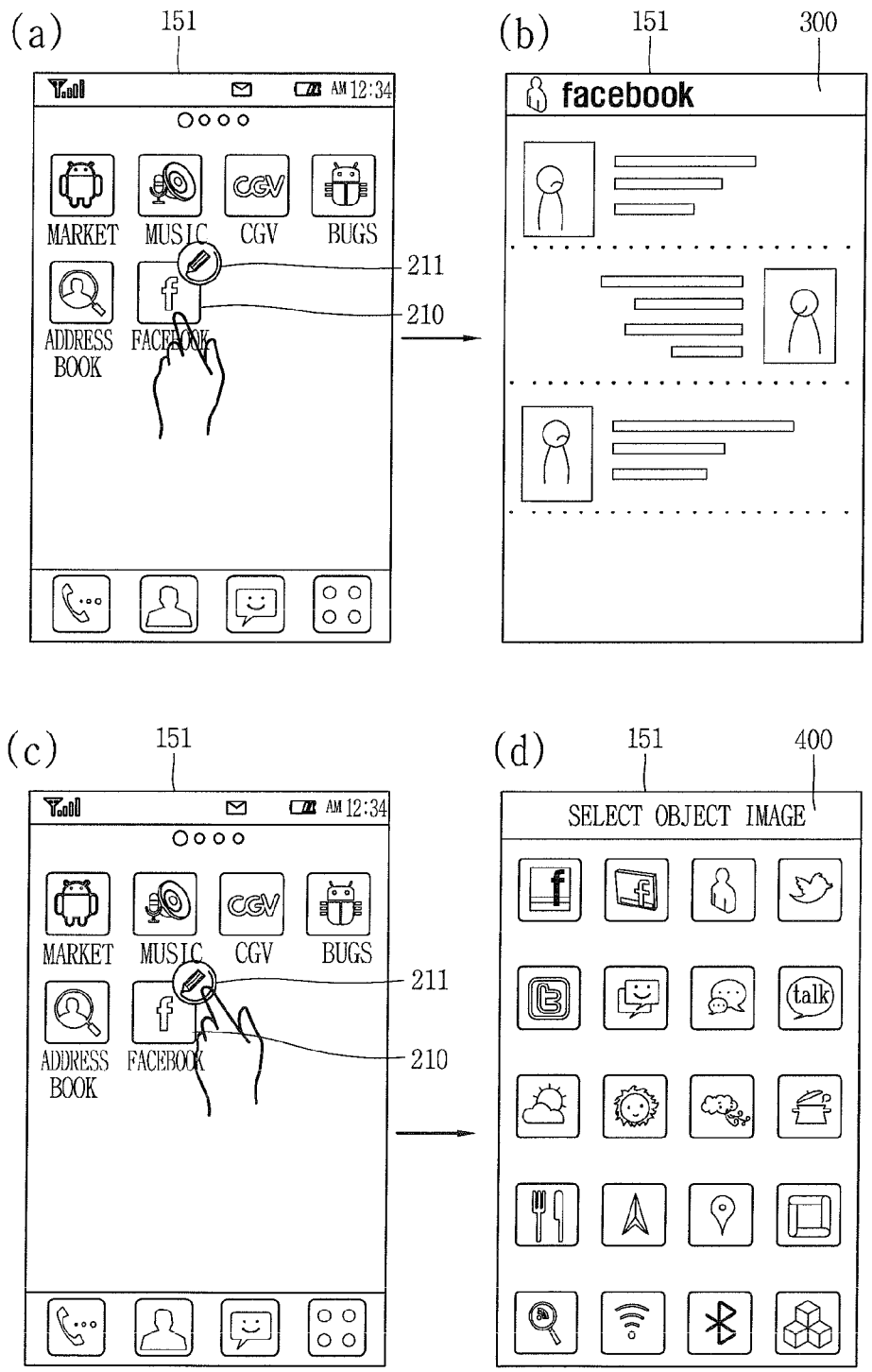
Figure 6C:
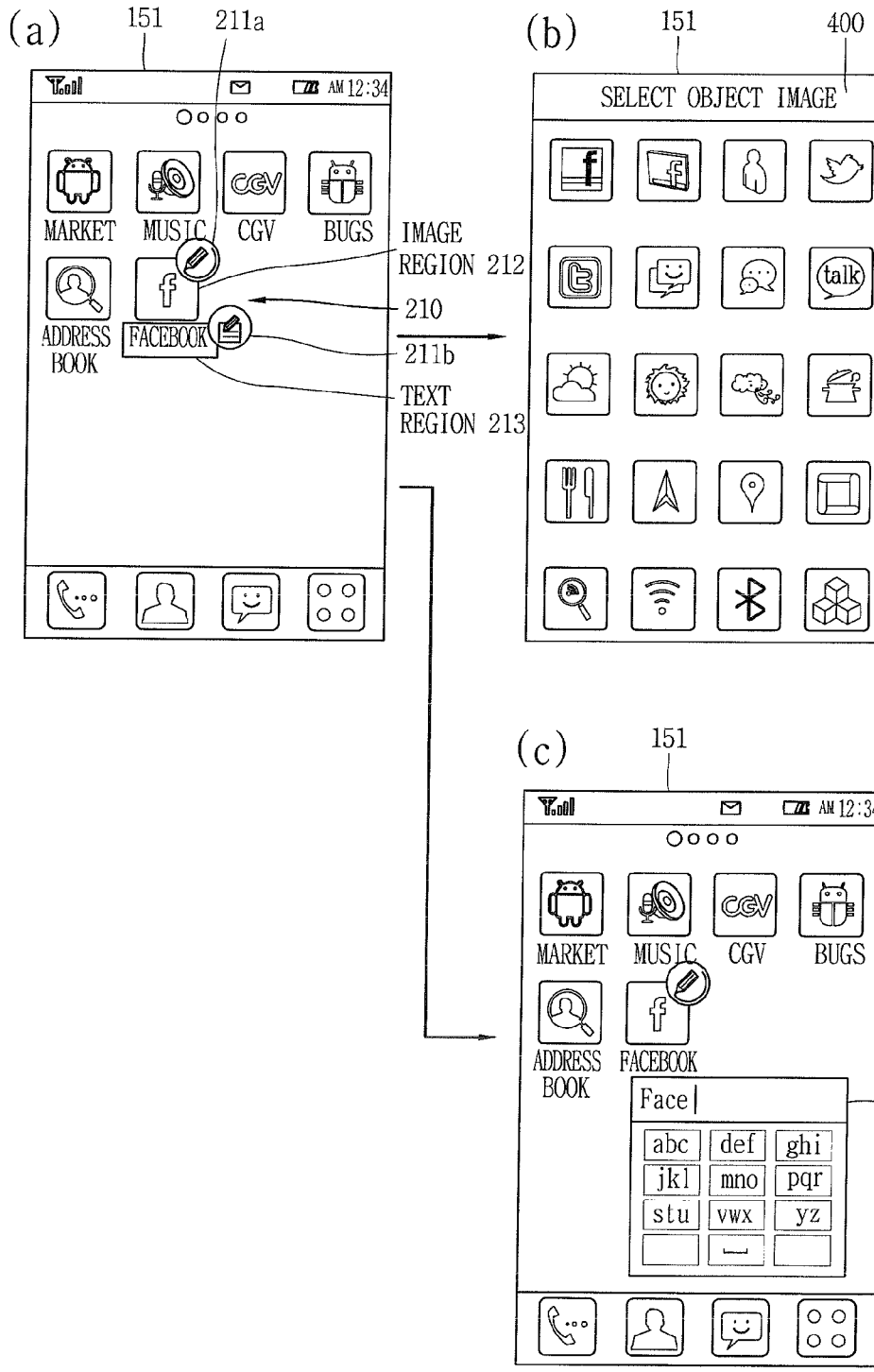

FIGS. 6A-6C illustrate exemplary views of a mobile terminal displaying an edit screen, according to one embodiment. As illustrated in FIG. 5C, the controller 180 executes the edit mode based on a touch input configured to initiate the edit mode (e.g., the long press touch input) on the object 210 displayed on the display unit. The controller 180 then displays the notification image 211 overlapped on at least part of the object 210, as illustrated in FIG. 6A (*a*) and FIG. 6A (*b*). In response to the execution of the edit mode, the notification image 211 is displayed, and when the object 210 is selected as illustrated in FIG. 6A (*a*) and (*b*), the edit screen 400, in which the property data of the object 210 can be modified, is displayed as illustrated in FIG. 6A (*c*). That is, the controller 180 generates a control command to display the edit screen 400 based on the touch input on the object 210, and even if the touch input is applied on a region of the object 210 which excludes the notification image 211, a control command for displaying the edit screen 400 on the display unit 151 can be generated.

The controller 180 displays the edit screen 400 as illustrated in FIG. 6B (*d*) only if a touch on the notification image 211 is detected as in FIG. 6B (*c*). The controller 180 displays the execution screen 300 of the application associated with or linked to the object 210 as illustrated in FIG. 6B (*b*) instead of the edit screen 400 if the region of the object 210 which excludes the notification image 211 is touched upon as illustrated in FIG. 6B (*a*). As illustrated in FIG. 6C (*a*), the object 210 may comprise an image region 212 for displaying an image and a text region 213 for displaying text. The controller 180 displays a notification image 211*a* and a notification image 211*b* which corresponds to the image region 212 and the text region 213, respectively. If the user selects the notification image 211*a* which corresponds to the image region 212, the controller 180 displays the edit screen 400 on the display unit 151 which can be used to modify the image displayed on the image region 212 as illustrated in FIG. 6C (*b*). If the user selects the notification image 211*b* which corresponds to the text region 213, the controller 180 displays the edit screen 401 on the display unit 151 which can be used to modify the text displayed on the text region 213 as illustrated in FIG. 6C (*c*). The edit screen 401 may comprise a virtual keypad, and the language of the virtual keypad may be initially determined based on the current language used in the text region 213. For example, if the 'FACEBOOK' is in Korean, the virtual keypad may be formed with Korean characters. However, if the 'FACEBOOK' is in English, the virtual keypad may be formed with English characters. The virtual keypad may also comprise at least one of mode conversion keys to convert to and from Korean mode, English mode, symbol mode, or number mode. The text region may be used as a display window for text entered via the virtual keypad, and the text edit mode may be canceled in response to tapping on the displayed text. As described thus far, the mobile terminal according to various embodiments, the edit screen may be displayed through applying a touch input to the notification image.

Figure 7A:
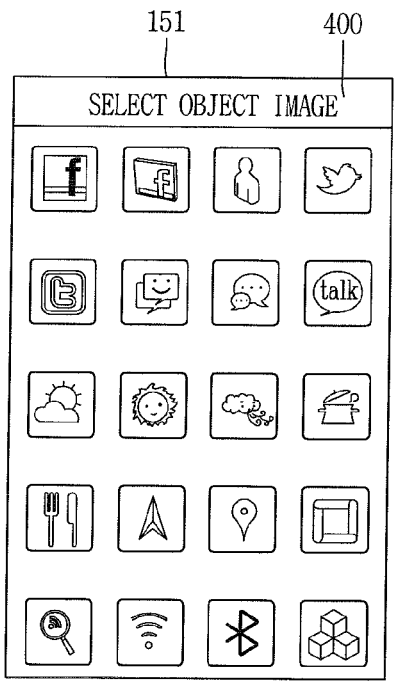
FIGS. 7A-7C illustrate exemplary views of a mobile terminal displaying an edit screen, according to one embodiment.
Figure 7B:
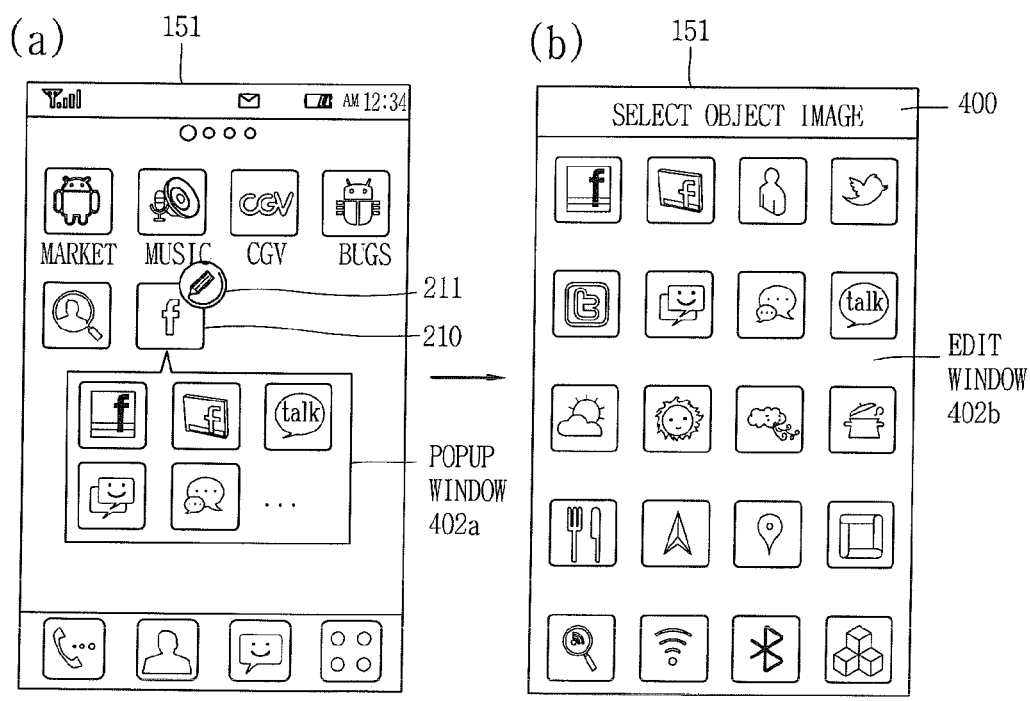
Figure 7C:
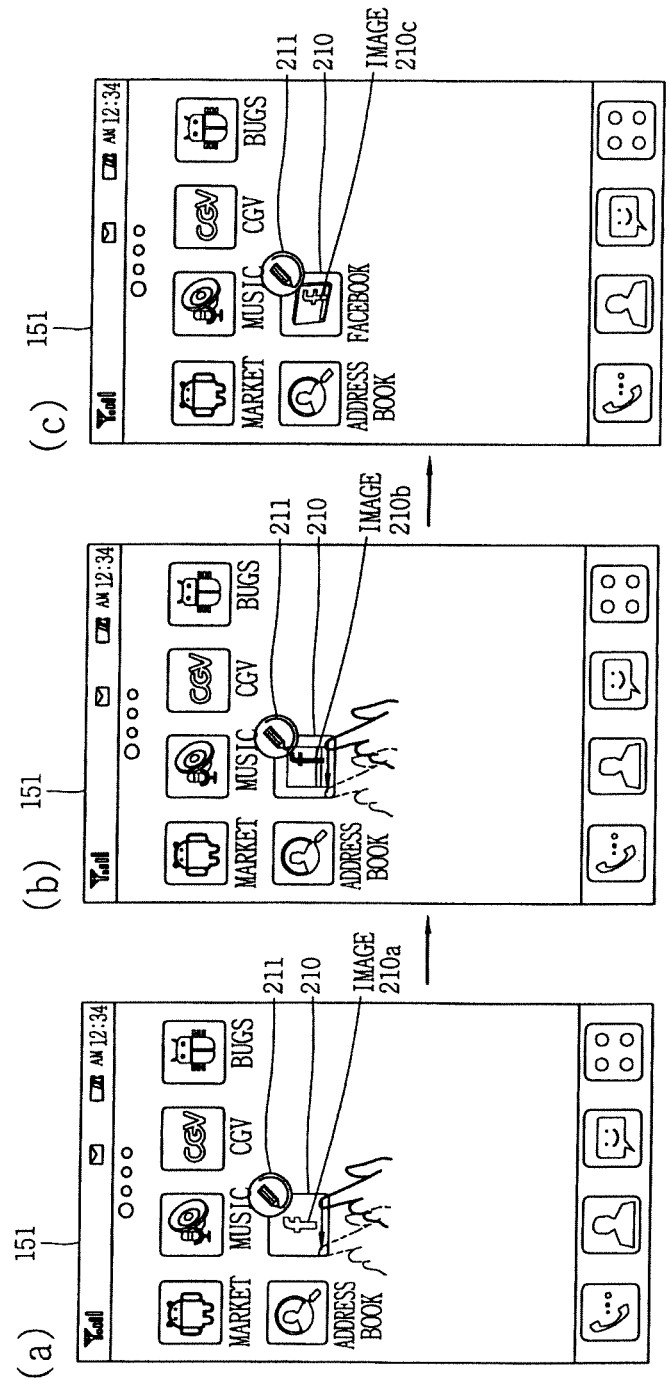

FIGS. 7A-7C illustrate exemplary views of a mobile terminal displaying an edit screen, according to one embodiment. In one embodiment, in FIG. 7A, the edit screen is displayed on the entire screen of the display unit 151. In this case, the idle screen, home screen, or menu screen that has been displayed on the display unit 151 may be converted into the edit screen 400. In another example embodiment, as in FIG. 7B (*a*), the edit screen may be displayed in a popup 402*a* window while the idle screen, home screen, or menu screen is displayed on the display unit 151. The popup window 402*a* may be overlapped on the screen on the display unit 151. Further, as in FIG. 7B (*b*), the controller 180 displays the edit window 402*b* in full screen in response to the user selection thereof. Moreover, the controller 180 may modify the property data of the object 210 using preconfigured touch inputs rather than using the edit screen as in FIGS. 7A and 7B. For example, when an object is in the edit mode, the controller 180 may change the object into a different image when a flicking touch on the object is detected. In 7C (*a*), the controller 180 converts from an image 210*a* of the object 210 as in FIG. 7C (*a*) to an image 210*b* of the object 210 as in FIG. 7C (*b*) when a flicking touch input is detected. Moreover, the image 210*b* of the object 210 as in FIG. 7C (*b*) may be converted to an image 210*c* of the object 210 as in FIG. 7C (*c*) when a flicking touch input is applied once again. In one example implementation, the images converted in response to the flicking touch input may be the ones with high correlation with the application or the ones that are being used or selected most frequently by the user. In addition, the edit screen that is displayed upon the launching of the edit mode may be formed in various ways.

Figure 8A:
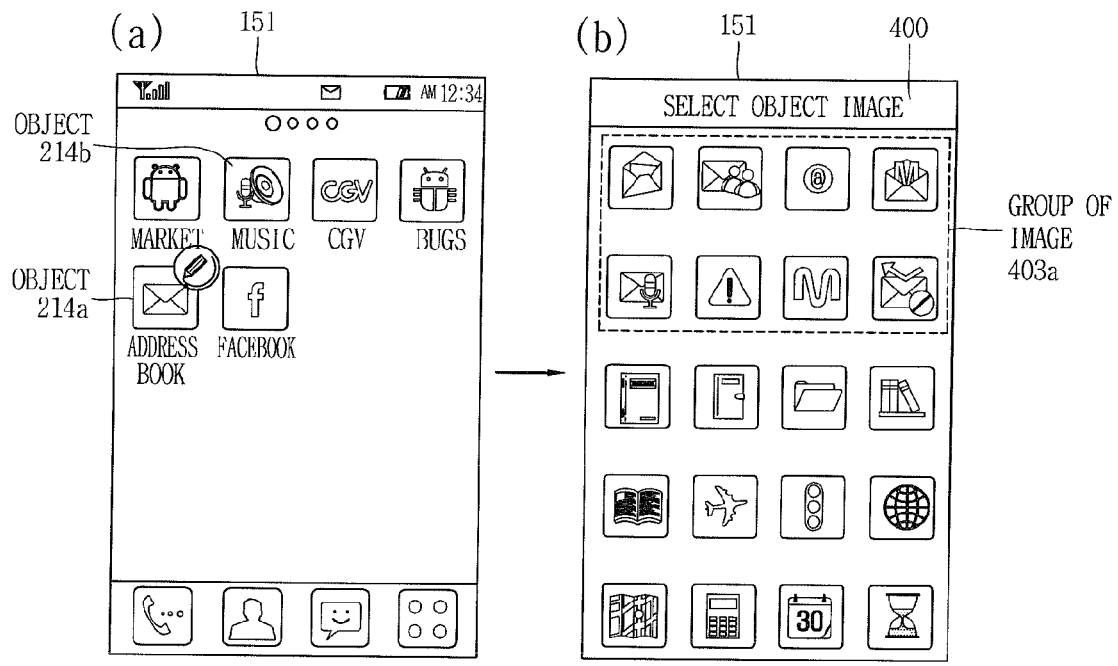
FIGS. 8A-8C illustrate exemplary views of placing images on an edit screen of a mobile terminal, according to one embodiment.
Figure 8B:
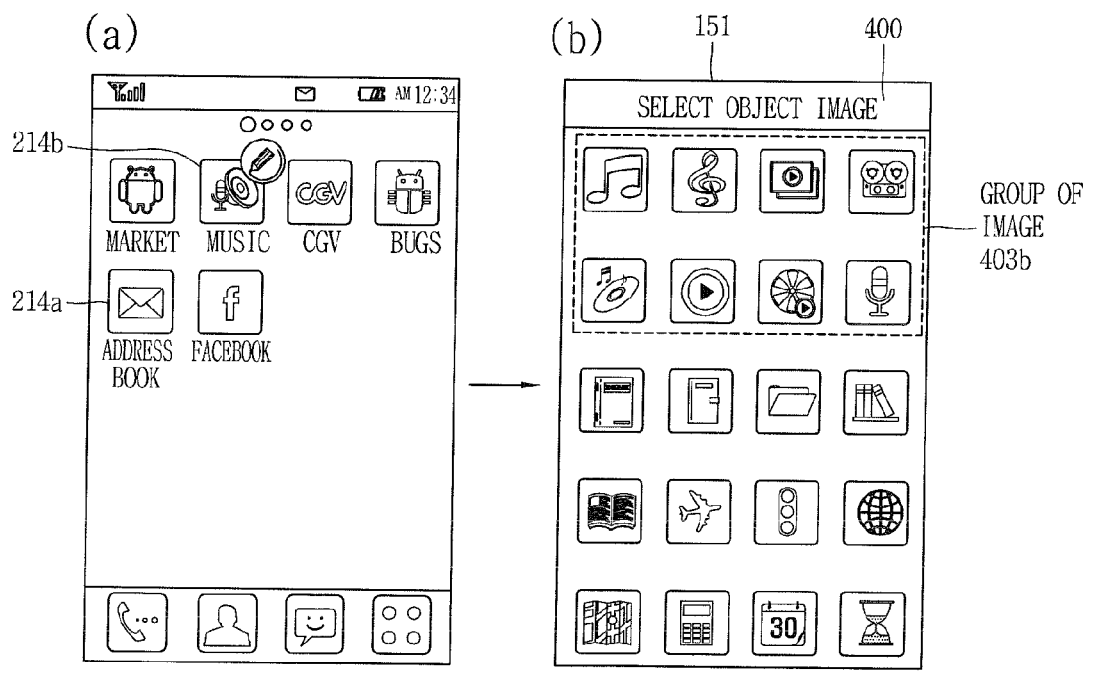
Figure 8C:
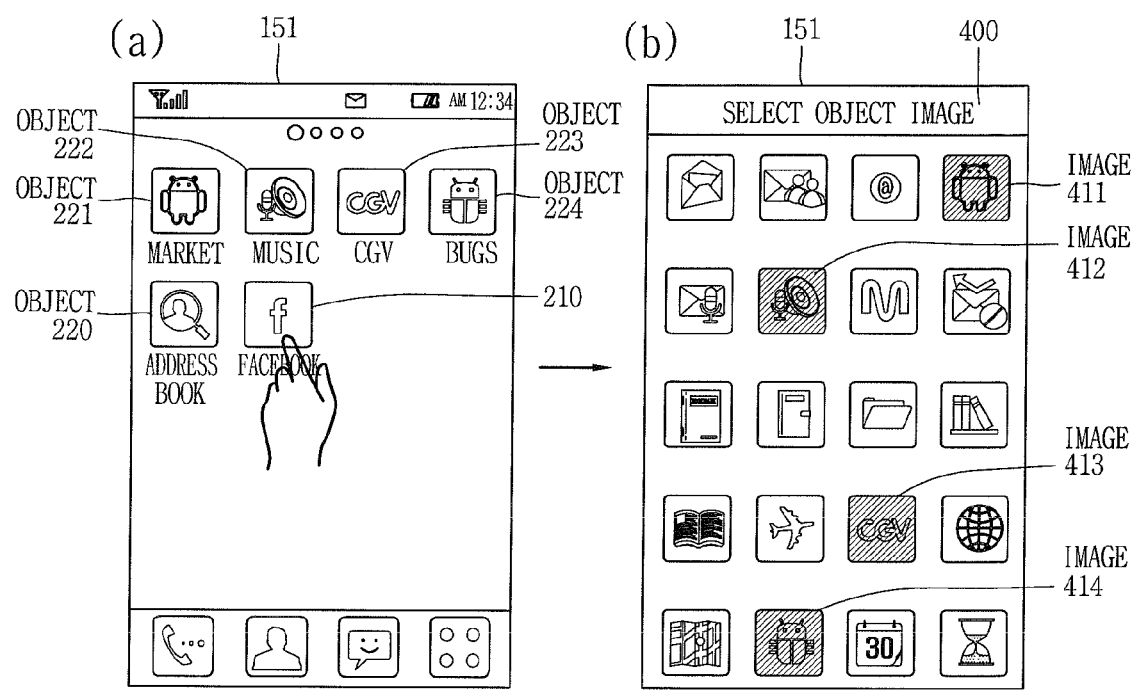

FIGS. 8A-8C illustrate exemplary views of placing images on an edit screen of a mobile terminal, according to one embodiment. In one embodiment, the user may modify the property data of an object using an edit screen. The property data of the object comprises data associated with the at least one of the image, the size, the color, the text, the font, the sound of the object, the page initially displayed when the application associated with or linked to the object is executed, the privacy protection afforded by the application, the appearance of the object, or the way to enter into the application associated with the object.

That is, the user may modify the property data of the object via the edit screen once the object is selected, and the controller 180 may arrange the multiple images displayed on the edit screen according to a predetermined order. For example, the controller 180 may place images associated with the property of the application which corresponds to the object to be placed on top of the edit screen, thus making easier for the user to convenient select the object for editing work. Further, the controller 180 may place multiple images each of which can be assigned as the image of the object based on at least one of the frequency of the images being selected as the image of the object, the frequency of the images being selected by the user as the image of the object, or the relevance of the images to the application linked to the object. For example, as illustrated in FIG. 8A (*a*), if the object 214*a* is associated with or linked to an email application, the controller 180 may place a group of images 403*a* those are related to the email application on top of the edit screen 400 as in FIG. 8A (*b*). Further, images with the first word of their text corresponding to the application may be placed before other images. Moreover, the images on the edit screen may be placed by default (e.g., the default arrangement for the images on the edit screen provided by the service company, mobile communication company, the maker of the mobile terminal, and so on). In another example, as illustrated in FIG. 8B (*a*), if the object 214*b* is associated with or linked to a music application, the controller 180 may place a group of images 403*a* those are related to the music application on top of the edit screen 400 as in FIG. 8B (*b*). Thus, by prominently placing on the edit window the group of images associated with the object whose image is about to be replaced, the user may spend less time to search for the candidate images for the object. The controller 180 may place low power consuming images or icons on the edit window, and when the image of the object to be edited is a low power consuming object, the level of the remaining battery or battery usage may be marked on a portion of the image.

In one embodiment, the controller 180 may inform the user the images of other objects used in the idle screen, home screen, or menu screen along with the object. For example, in FIG. 8C (*b*), the controller 180 distinctly displays images 411-414 on the edit screen since the images 411-414 are being used as the images of objects 221-224 as shown in FIG. 8C (a). In FIG. 8C (b), the images 411-414, which are being used for the objects 221-224, are darkened to distinguish them from the remaining images that are not in use. In case any one of the images 411-414 is selected by the user as the image of the object 210, notification data informing that the selected image already represents another object is displayed on the display unit 151 so that the selected image may not be used to replace the current image of the object 210. Alternatively, if the user selects an image for an object where the image is already being used by another object, the user may give an option to create a group for the two objects and use the group in the idle screen. In such case, the image may be assigned as the representative image for the group. That is, the image for the group of objects may be replaced with the selected image while the grouping of objects is performed. Further, the controller 180 may be configured to ignore the user's selection for the object 210 with one of the images 411-414 which have already been assigned to the objects 221-224 in order to prevent the image of the object 210 from replaced by the selected image or the image in use.

In various embodiments, each image for the objects is prevented from being assigned to multiple objects so that the user may be saved from the confusion of dealing with two or more objects represented by the identical image. The images that can be assigned to the objects may be images which are already stored on the memory 160, and the controller 180 may provide the images on the edit screen so that they can be assigned to the objects. Further, besides the images stored in the memory, a variety of images obtained or captured through various means can be used to represent the objects.

Figure 9A:
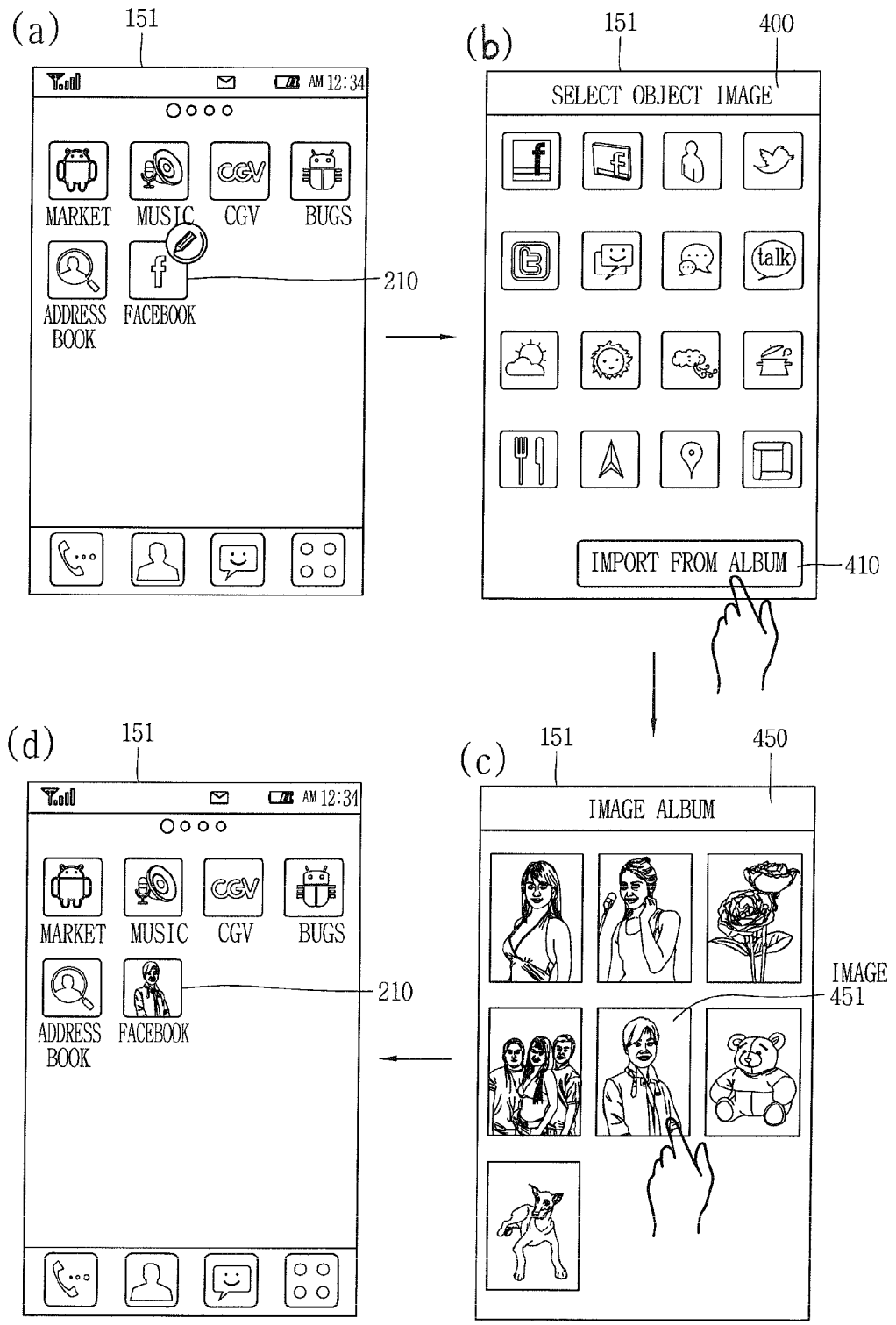

FIGS. 9A-9E illustrate exemplary views of configuring an image for an application object using images stored in a memory of a mobile terminal, according to one embodiment. In one embodiment, images captured via the camera of the mobile terminal may be configured as the representative images for the objects. For example, in FIG. 9A (a), when the edit mode for the object 210 is initiated, the controller 180 displays the images stored in an album of images in response to selection by the user, as illustrated in FIG. 9A (b). In addition, if an image 451 is selected as in FIG. 9A (c), the controller 180 configures the image 451 as the image for the object 210, as illustrated in 9A (d). That is, as illustrated in FIG. 9A (b), an icon 410 ("import for album") to invoke the images stored in the image or photo album may be formed on the edit screen 400, and when the icon 410 is selected, the controller 180 displays the images from the photo album as in FIG. 9A (b). Further, the controller 180 configures the image 451 selected by the user as the image for the object 210 as in FIG. 9A (d). Moreover, if multiple images are selected as the images for the object, the controller may configure the multiple objects as a moving image for the object. That is, the multiple objects may alternate (periodically) as the moving image for the object.

The controller 180 may configure at least part of a moving image file stored in the memory to represent the object. Further, in FIG. 9B (a), the controller 180 provides the feature of editing the selected image. That is, the controller 180 displays an edit window 460 to select and assign a region of the image selected by the user to the object. The user may edit or modify the selected image using the edit window 460. In one example implementation, the user may delete a part of the selected image using the edit window 460. The controller 180 further detects the facial image from an image 451 selected by the user using an image recognition algorithm. A guide or facial image 451a is generated to indicate the region corresponding to the facial image and to help the user to select the detected facial image. The image recognition algorithm (e.g., for detecting a person) is used to detect the facial image from the image selected by the user, and the guide image 451a which corresponds to the detected facial image to guide the user to select the facial image. The image recognition algorithm detects a character or person included in an image displayed on the display unit 151, and it is able to detect the facial image using the outline data or appearance of the person in the image. In addition, if the region which corresponds to the guide image 451a is selected by the user as in FIG. 9B (a), the controller 180 assigns the facial image detected by the image recognition algorithm as the image of the object 210 which can be modified as illustrated in FIG. 9B (b). Further, if there are multiple facial images detected from the image 451 as in FIG. 9C (a), their respective guide images (e.g., the guide image 451a and the guide image 451b) are displayed. Likewise, if any one of the multiple facial images is selected by the user, the selected facial image is assigned to represent the object 210 as in FIG. 9C (b).

Figure 9D:
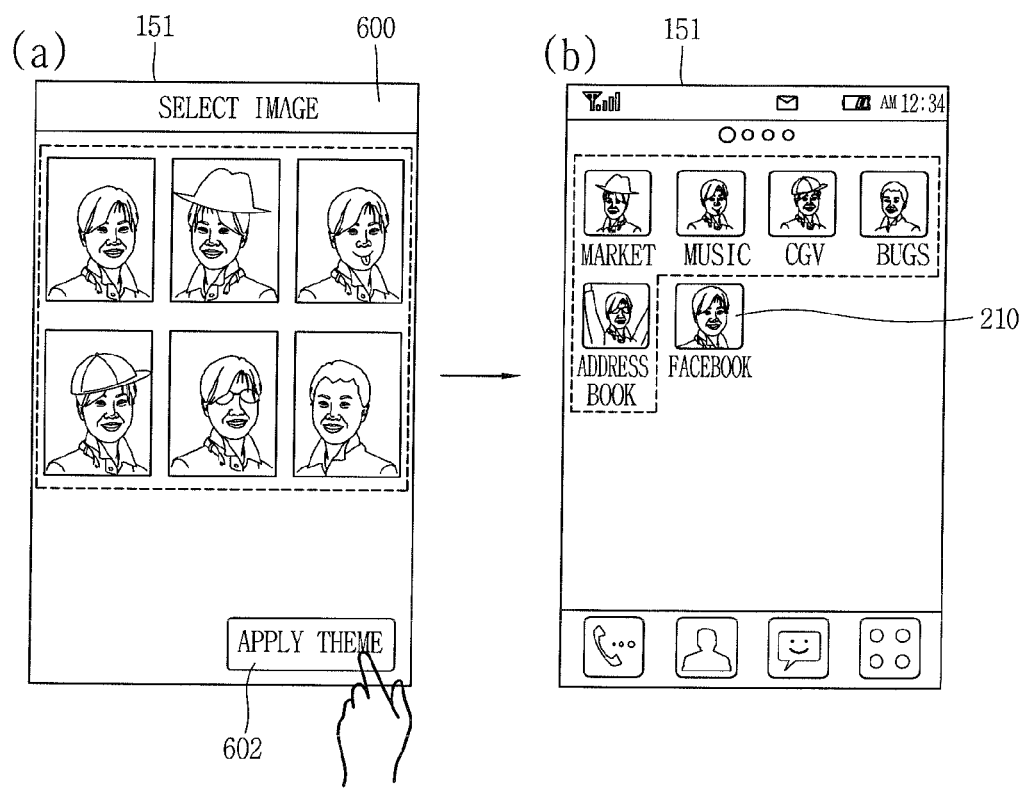
Figure 9E:
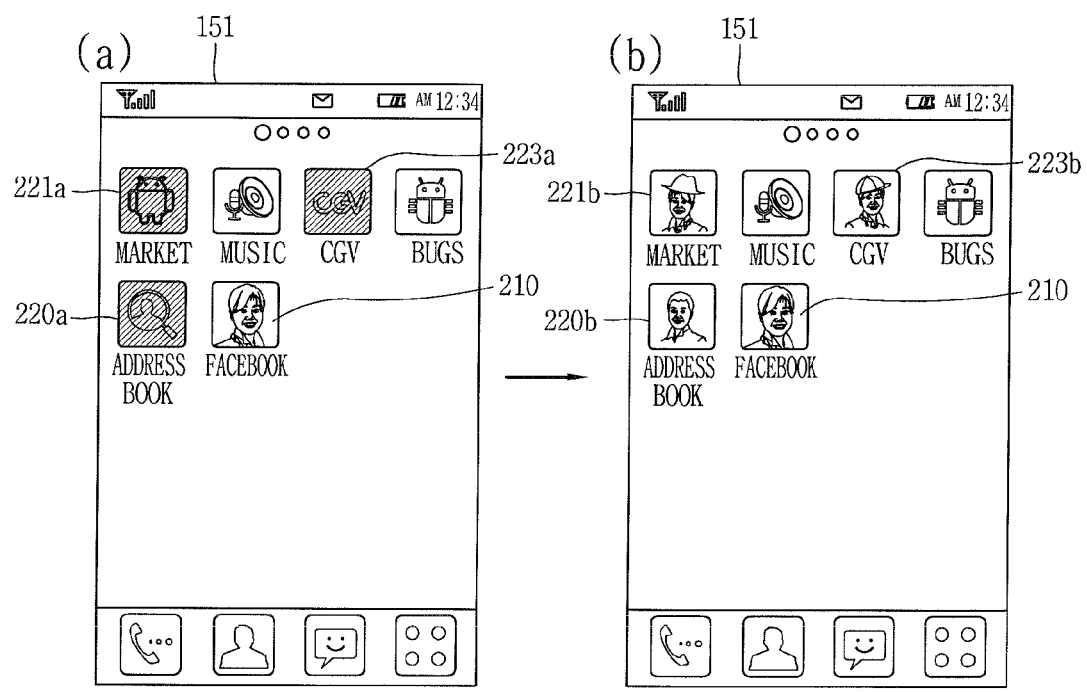

If any one of the images in the image or photo album is selected as in FIG. 9A (c), the controller 180 can search for the images which includes the facial image which corresponds to the image detected using the image recognition algorithm and those are available through the image or photo album or the database in the network as in FIG. 9D (a). In such case, the user may log into the cloud service and/or social network service via the network and call for the images from the user's own account or from the user's friends' accounts. Further, similar images to the selected image (e.g., an image of a singer, actor, or celebrity) can be searched and called in. Moreover, the controller 180 may detect the facial images from the images of which the search was performed, and display the facial images as in FIG. 9D (a). The user may select an image from the searched images, and choose to display the facial region of the image which corresponds to the facial region of the object being modified. The controller 180 then configures one of the searched images as the image of the object based on the user selection. The controller 180 also changes the images of other objects using the searched images. That is, the controller 180 may change the image of the object being edited or configured as well as the images of other objects displayed on the display unit 151.

For example, as illustrated in FIG. 9D (a), if an icon with a theme (e.g., apply theme 602) applied on it is selected by the user, the controller 180 can transform or convert the images of the object 210 as well as other related object at once to the image chosen from the searched images. In one example implementation, the related object may be placed on the same screen as the object 210 being configured, or the application associated with the related object could be similar type as the application of the object 210. In addition, the controller 180 may change the image of the object being configured as well as the image(s) of other objects using the searched images based on the user selection. For example, in 9E (a), if objects other than the object 210 currently being configured (e.g., objects 221a-224a) is selected by the user, the controller 180 changes the images of the objects as well as the image of the object 210 using the search images as in FIG. 9E (b). The controller 180, during the edit mode, may also modify the property data of the objects (e.g., objects 221b-223b) whose applications are related to the applications of the object 210 according to the change in the property data of the object 210. Further, the controller 180, during the edit mode, may also modify the property data of the object which corresponds to the application selected by the user as well as the property data of the object selected by the user according to the change in the property data of the object 210. Likewise, the inconvenience of individually modifying the property data of each object may be reduced by modifying the property data of other objects in addition to the property data of the object being modified.

FIG. 10 illustrates an exemplary view of configuring an image captured by a camera of a mobile terminal as an image for an object displayed on the mobile terminal, according to one embodiment. In one embodiment, the image entered by the camera of the mobile terminal may be configured as the image of the object. For example, in FIG. 10 (a), the controller 180 activates the camera 121 of FIG. 1 in response to the user selection when the object 210 displayed on the display unit initiates the edit mode as in FIG. 10 (b). In addition, once an image 450 is captured by the camera as in FIG. 10 (c), the controller configures the captured image 450 as the image of the object 210 as in FIG. 10 (d). The controller 180 may also provide the feature of modifying the image(s) captured through the camera.

Figure 11:
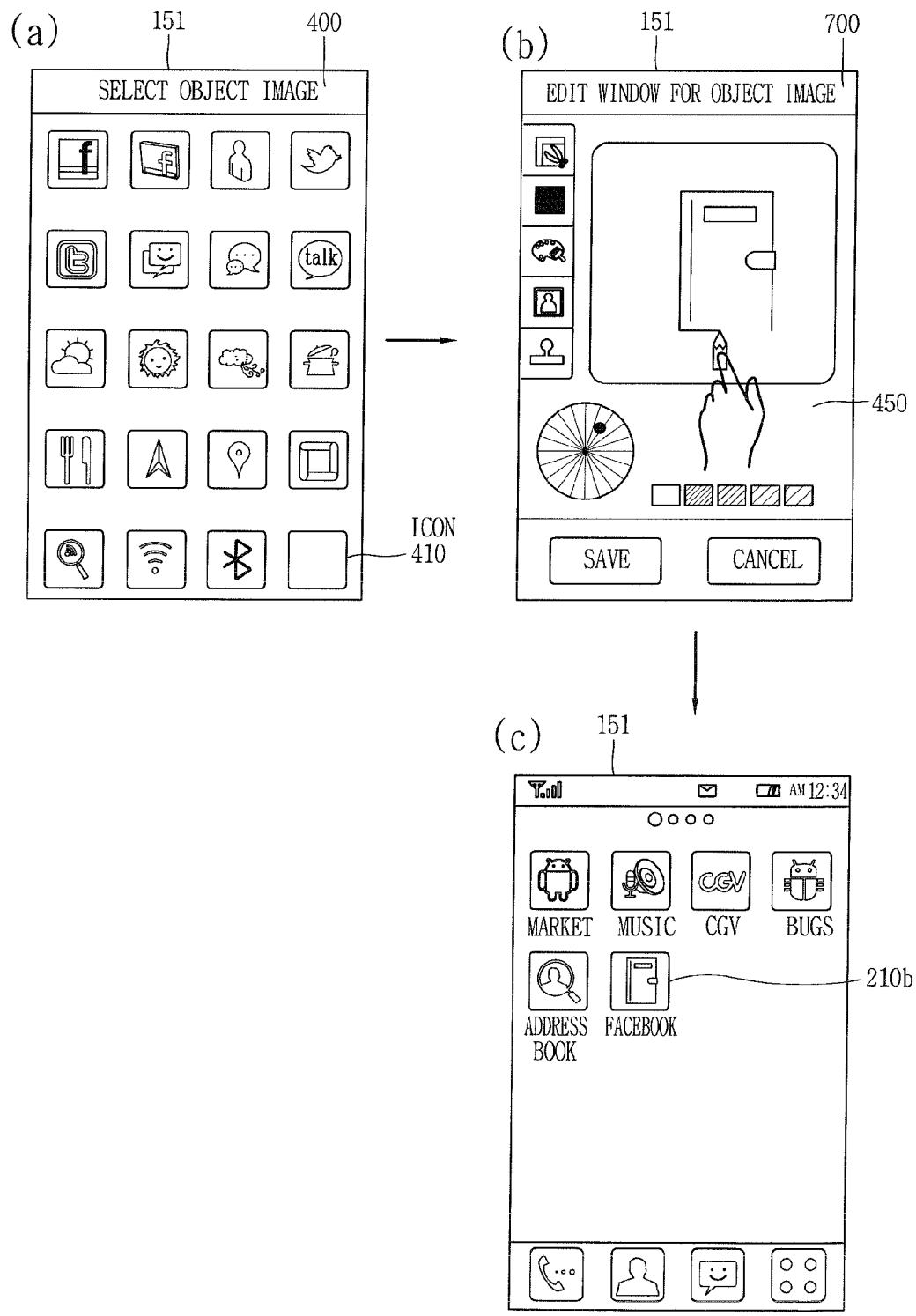
FIG. 11 illustrates an exemplary view of configuring an image entered by a user as an image for an object displayed on a mobile terminal, according to one embodiment.

FIG. 11 illustrates an exemplary view of configuring an image entered by a user as an image for an object displayed on a mobile terminal, according to one embodiment. For example, once an icon 410 to receive the image data is selected from the edit screen 400 configured for selecting the image(s) of the object(s) displayed on the display unit as in FIG. 11 (a), the input or edit window 450 is displayed on the display unit 151 as in FIG. 11 (b). Further, if the image data of the user is entered via the edit window 450 and once an image which corresponds to the image data is entered, the image can be assigned to the object 210 as in FIG. 11 (c). There may be no form on the white background for the icon 410 which is configured to receive the image data from the user so that the user may be informed of direct entry available for the image. The user may be able to search for the images through the web or Internet while the user is at the edit screen, and the controller 180 may automatically enter a search word (e.g., the type of the application, the name, the category, etc.) associated with the application corresponding to the object being modified to the search engine so that associated images may be searched. Thus, in various embodiments, in order to provide images of the objects displayed on the mobile terminal, besides the images with limited uses, a number of ways can be used to change the property data of the object, thus providing the user the visual pleasure while distinguishing the object from the rest.

Figure 12:
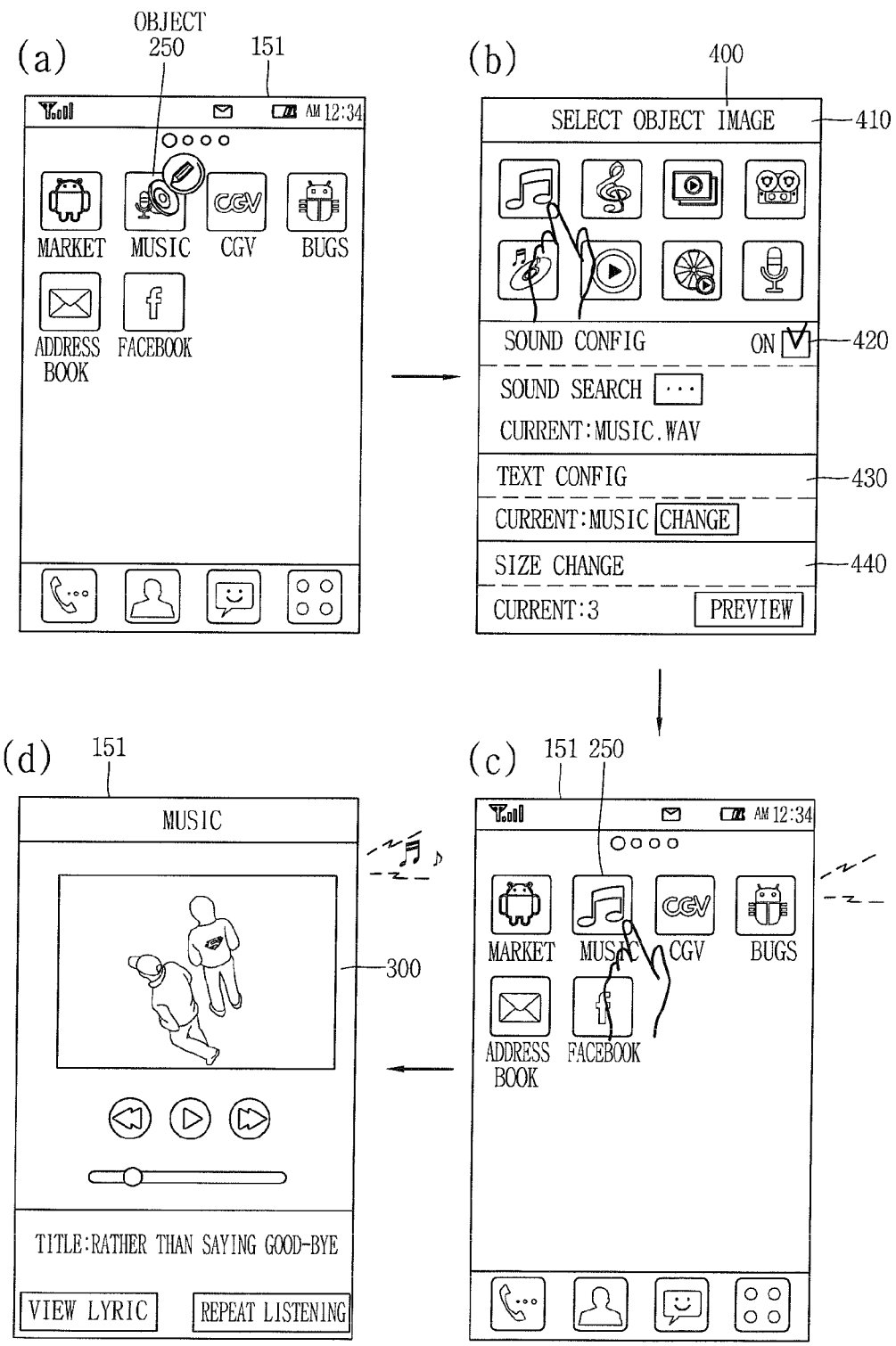
FIG. 12 illustrates exemplary views for forming an edit screen in a mobile terminal, according to one embodiment.

FIG. 12 illustrates exemplary views for forming an edit screen in a mobile terminal, according to one embodiment. Once the edit mode for the object 210 is carried out as illustrated in FIG. 12 (a), the controller 180 displays the edit screen 400 as in FIG. 12 (b). The user may change the property data of the object 250 via the edit screen 400, and the controller 180 may divide the edit screen 400 into multiple categories 410-440. The edit screen 400 may comprise categories which correspond to at least one of the image, size, color, and/or sound associated with the object, the first page displayed when the application associated with the object is initially accessed, or information relating to protection of privacy relating to the application use. The user may configure or modify the property data of the object being edited according to the multiple categories included in the edit screen 400. Thus, in case the property data of the object in at least one of the multiple categories is changed, the controller 180 may apply the change to the object at once.

For example, in FIG. 12 (b), if the image or sound is modified under the category of select object image 410 or sound config 420, the controller 180 changes the property data of the object to change the image of the object 250 and to generate the sound as in FIG. 12 (c). Accordingly, in FIG. 12 (c), if the object 250 is selected, the controller 180 controls the audio output module 152 to generate the sound configured via the edit screen 400, and is able to execute the application associated with the object as in FIG. 12 (d). The basic volume under the bell sound mode configured by the user may be used for the sound, and the sound feature configured by the user makes it possible to generate the volume of sound if the object is selected even if the mobile terminal is configured to be in the vibration or silent mode.

Figure 13:
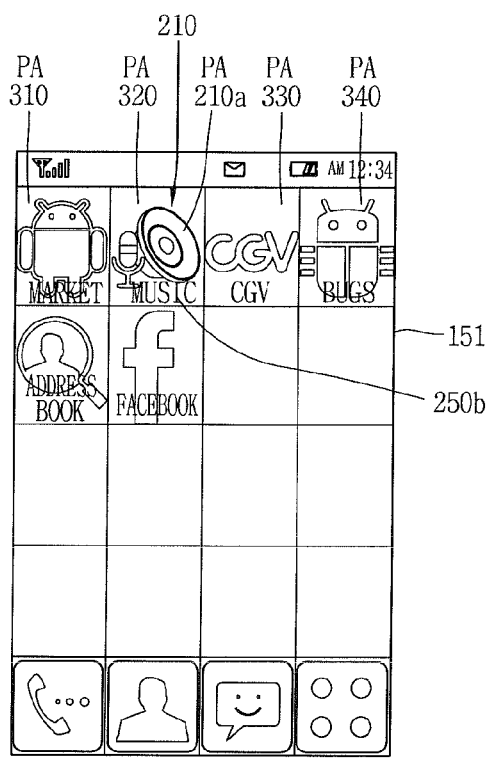
FIG. 13 illustrates an exemplary method for changing a size of an object displayed on a mobile terminal, according to one embodiment.

FIG. 13 illustrates an exemplary method for changing a size of an object displayed on a mobile terminal, according to one embodiment. In FIG. 13, the region where the object is displayed may be preconfigured. Accordingly, the user may enlarge the size of the object up to the size of preconfigured area (PA) 310-340. However, since the enlargement of the object may be limited by the objects in a vicinity of the object, the user may use a preview feature to measure the possible limit of the enlargement. As illustrated, the object may be enlarged up to the size of the rectangle the object is in, and the user may enlarge the object to correspond to the size of the rectangular region. In such case, the controller 180 may overlap the text region of the object with the image region of the object. In addition, the controller 180 may increase the visibility of the text by adopting the color of the text region in contrast to the color of the image region. If the image of the object is configured using an image from a photo or image album, the controller 180 can invoke the original image from the memory 160 in FIG. 1 such that the configuration of the original image is reconfigured to the image region of the object based on the user's modification of the object size.

Figure 14A:
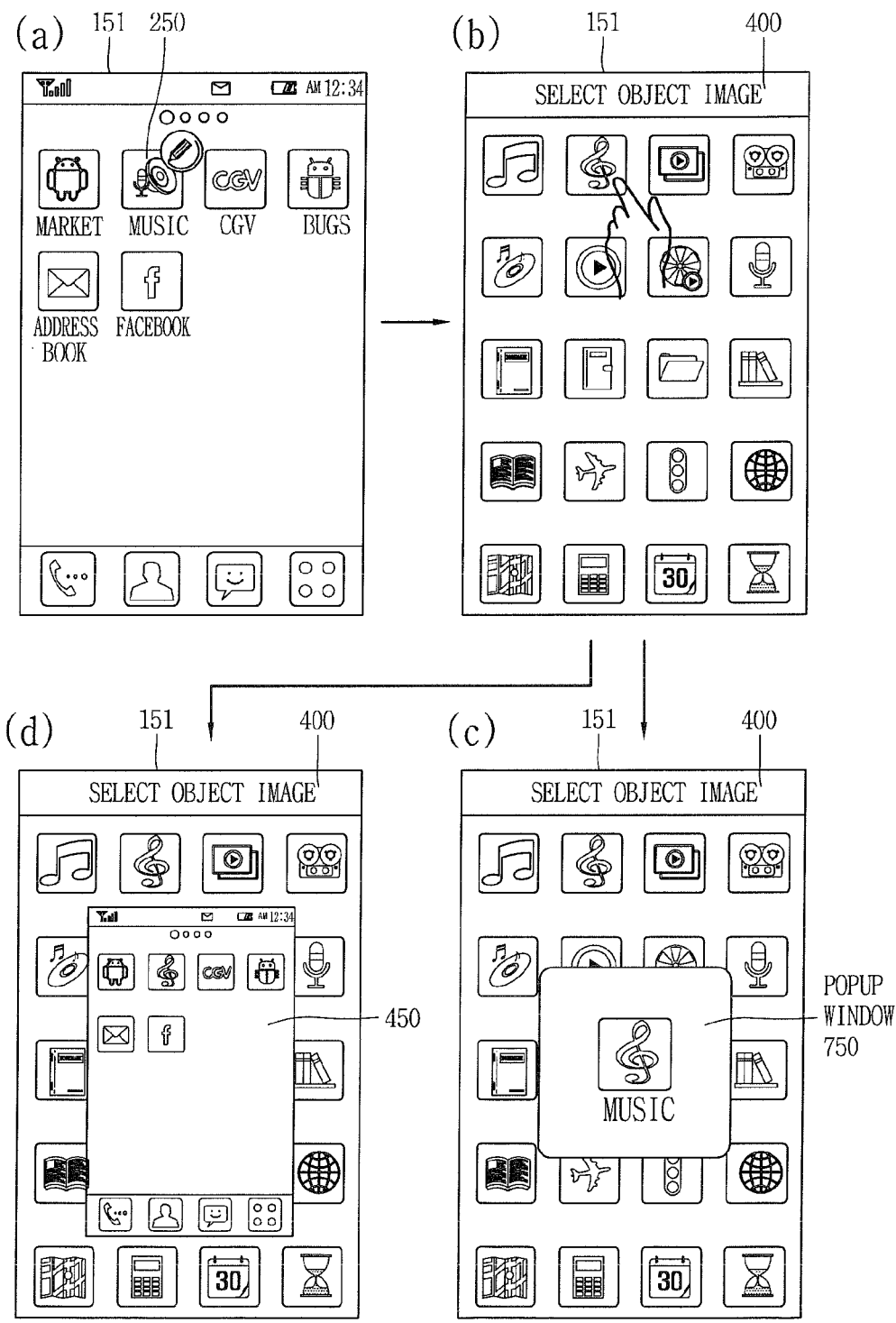
FIG. 14A and FIG. 14B illustrate an exemplary view a mobile terminal providing a preview screen, according to one embodiment.
Figure 14B:
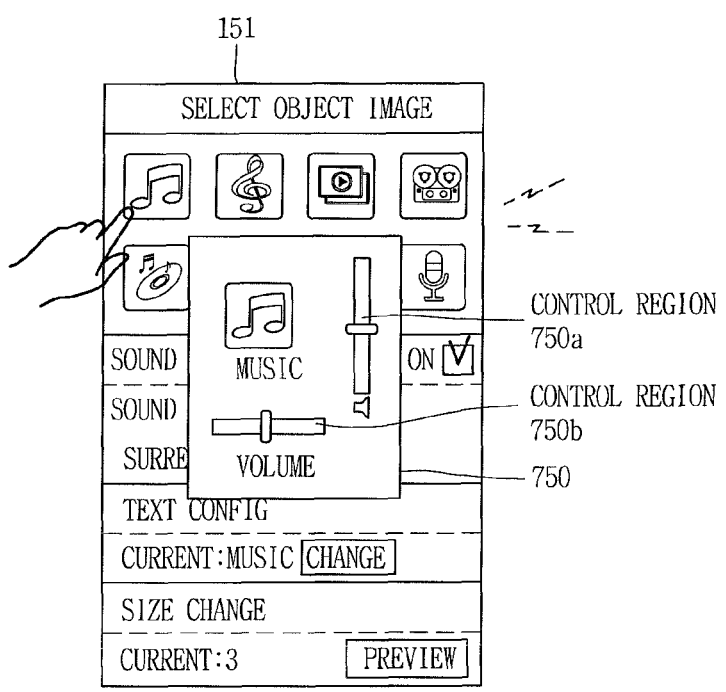

FIG. 14A and FIG. 14B illustrate an exemplary view a mobile terminal providing a preview screen, according to one embodiment. The controller 180 of the mobile terminal can provide a preview screen which temporarily applies newly configured property data of the object when the property data of the object, such as at least one of the image, size, color, text, font, or sound, is newly configured or modified. For example, in FIG. 14A (b), if an image (e.g., the G clef) is selected as the image of the object 250 for modification, the preview screen may be displayed using a popup window 750 as in FIGS. 14A (c) and 14A (d). The controller 180 may display the popup window 750 if the preconfigured type of touch (e.g., the long press touch input) is detected or if the preview icon is selected with respect to the image of the object 250 that is to be modified. In addition, as in FIG. 14A (d), the controller displays the idle screen, home screen, or menu screen with the property data of the object 250 changed via the popup window 750 so that the screen where the object 250 is placed can be seen by the user as in FIG. 14A (d).

As illustrated in FIG. 14B, when the sound is configured for the object 250 via the preview screen 750, the controller 180 displays a control region 750a where the volume of the sound can be configured by the user. In addition, via the preview window 750, the controller 180 can display a control area 750b where the size of the object may be configured. Moreover, the controller 180 can display multiple control regions associated with the property of the object via the preview screen. Through the preview screen, the user may change or newly configure the property data so that the property data of the object which reflects the temporary configuration can be checked in real-time.

As illustrated thus far, the mobile terminal and method thereof according to various embodiments may execute an edit mode in response to a touch input on the icons displayed on the display unit, where the property data of icons are changed during the edit mode. That is, one embodiment makes it possible to enter into an edit mode to change the object displayed on the display unit through differentiating the first type of touch which executes the application and the second type of touch which initiates the edit mode of the object. Accordingly, the user may reduce the inconvenience of executing the configuration menu in order to change the property of the icon or object.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. A mobile terminal, comprising:
a display configured to be touch sensitive; and
a controller configured to:
cause the display to display a plurality of objects associated with one or more applications on a home screen;
execute an edit mode of a first object to modify property data of the first object in response to a first type of touch received on the first object among the plurality of objects, the edit mode terminated when a predetermined period of time lapses after the execution of the edit mode is initiated, wherein objects other than the first object among the plurality of objects are not affected by the first type of touch received on the first object;
cause the display to display an indicator overlapping at least part of the first object, the indicator indicating that the first object is in the edit mode, while no indicator is overlapped with the plurality of objects other than the first object;
cause the display to display an edit screen for modifying property data of the first object or an execution screen of an application corresponding to the first object in response to a second type of touch received on the first object based on whether the first object is in the edit mode when the second type of touch is received, wherein the second type of touch is different from the first type of touch;
cause the display to display the edit screen comprising a plurality of images including a first image representing the first object in response to the second type of touch received on the first object overlapped with the indicator while the first object is in the edit mode, wherein the first image is positioned at a first position while images other than the first image among the plurality of images are positioned at positions other than the first position within the edit screen, wherein the first position and the other positions are arranged in order in at least a vertical or horizontal direction;
terminate the edit mode of the first object when the predetermined period of time lapses such that the indicator is no longer displayed; and
cause the display to display the execution screen in response to the second type of touch received on the first object after the termination of the edit mode of the first object.

2. The mobile terminal of claim 1, wherein the first type of touch comprises a long press touch, and wherein the controller is further configured to cause the display to display the indicator upon a release of the long press touch.

3. The mobile terminal of claim 2, wherein the controller is further configured to:
switch a state of the first object such that the first object becomes movable on the home screen upon sensing the long press touch; and
cause the display to display the indicator if a position of the first object is not altered upon the release of the long press touch.

4. The mobile terminal of claim 1, wherein the controller is further configured to terminate the edit mode of the first object and to execute an edit mode of the second object when the first type of touch is sensed on the second object among the plurality of objects during the edit mode of the first object.

5. The mobile terminal of claim 1, wherein the first object comprises an image region and a text region, and wherein the controller is further configured to cause the display to display the edit screen to change at least one of an image, a size, a color, a text, a font, or a sound of the first object during the edit mode of the first object.

6. The mobile terminal of claim 1, wherein the plurality of images are arranged on the display based on their frequency of use or a degree of their association with an application which corresponds to the first object.

7. The mobile terminal of claim 5, wherein the edit screen comprises a plurality of categories which correspond to at least one of the image, the size, the color, the text, the font, or the sound of the object, and wherein the at least one of the image, the size, the color, the text, the font, or the sound of the first object is configured using the plurality of categories.

8. The mobile terminal of claim 7, wherein the controller is further configured to implement the property data of the first object when at least one of the plurality of categories is newly configured in response to an input.

9. The mobile terminal of claim 5, wherein the controller is further configured to cause the display to display an update of the property data of the first object on a preview screen when the at least one of the plurality of categories for the first object is newly configured via the edit screen.

10. The mobile terminal of claim 9, wherein the controller is further configured to cause the display to display a control region on the preview screen for modifying at least the sound or the size of the first object.

11. The mobile terminal of claim 5, wherein the property data of the first object comprises data associated with the at least one of the image, the size, the color, the text, the font, or the sound of the first object, and wherein the controller is further configured to change property data of objects whose applications are related to the application associated with the first object and property data of an object associated with each application selected by a user when the property data of the first object is changed based on the user input.

12. The mobile terminal of claim 5, wherein the edit screen comprises an icon with an input window for receiving the image of the first object directly from a user, and wherein the controller is further configured to assign an image which corresponds to image data as the image of the first object when the image data is entered via the input window based on selection of the icon.

13. The mobile terminal of claim 5, wherein the edit screen comprises an icon to access images included in a photo album stored in a memory, and wherein the controller is further configured to cause the display to display the images included in the photo album in response to selection of the icon and to configure one of the images selected by a user as an image representing the first object.

14. The mobile terminal of claim 13, wherein the controller is further configured to cause the display to detect a facial image from the image selected by the user using an image recognition algorithm, and to provide a guide image for selecting the facial image on a region which corresponds to the facial image.

15. The mobile terminal of claim 14, wherein the controller is further configured to search for at least one image which includes another facial image which corresponds to the facial image, and to cause the display to display data of the at least one image.

16. The mobile terminal of claim 13, wherein the controller is further configured to cause the display to display the edit screen for selecting a region on an image selected by the user from the photo album as the image of the first object.

17. The mobile terminal of claim 13, wherein the controller is further configured to generate a moving image using a plurality of images from the images included in the photo album if the plurality of images are selected from the photo album and to assign the moving image as an image representing the first object.

18. The mobile terminal of claim 1, wherein:
the indicator is displayed on the home screen; and
the second type of touch is applied, in the edit mode, to the first object on the home screen, on which the plurality of objects are displayed, to change the home screen to the edit screen.

19. The mobile terminal of claim 1, wherein the controller is further configured to cause the display to change the home screen to the edit screen when the second type of touch is applied to the indicator overlapping the at least part of the first object.

20. The mobile terminal of claim 1, wherein the home screen is changed to the edit screen when the second type of touch is applied to an area of the first object that does not overlap with the displayed indicator.

21. The mobile terminal of claim 1, wherein the home screen is changed to the edit screen when the second type of touch is applied to the indicator.

22. The mobile terminal of claim 1, wherein:
the first object comprises an image region and a text region;
the indicator comprises a first indicator associated with the image region and a second indicator associated with the text region;
the edit screen comprises an image edit screen and a text edit screen; and
the controller is further configured to cause the display to:
display the image edit screen when the second type of touch is applied to the first indicator; and
display the text edit screen when the second type of touch is applied to the second indicator.

* * * * *